(12) United States Patent
Mizuta

(10) Patent No.: US 7,487,449 B2
(45) Date of Patent: Feb. 3, 2009

(54) REACTION INFORMATION DISPLAY SYSTEM

(75) Inventor: Takeshi Mizuta, Takarazuka (JP)

(73) Assignee: Up Inc., Hyogo (JP)

( * ) Notice: Subject to any disclaimer, the term of this patent is extended or adjusted under 35 U.S.C. 154(b) by 173 days.

(21) Appl. No.: 10/583,980

(22) PCT Filed: Dec. 22, 2003

(86) PCT No.: PCT/JP03/16497

§ 371 (c)(1),
(2), (4) Date: Jun. 22, 2006

(87) PCT Pub. No.: WO2005/062218

PCT Pub. Date: Jul. 7, 2005

(65) Prior Publication Data

US 2007/0150811 A1    Jun. 28, 2007

(51) Int. Cl.
*G06F 3/00* (2006.01)
(52) U.S. Cl. .................. 715/700; 715/751; 715/716; 715/733
(58) Field of Classification Search .................. None
See application file for complete search history.

(56) References Cited

U.S. PATENT DOCUMENTS

| | | | | |
|---|---|---|---|---|
| 5,408,470 A | * | 4/1995 | Rothrock et al. | 370/261 |
| 5,504,589 A | * | 4/1996 | Montague et al. | 358/403 |
| 6,292,828 B1 | * | 9/2001 | Williams | 709/218 |
| 6,496,842 B1 | * | 12/2002 | Lyness | 715/206 |
| 6,539,421 B1 | * | 3/2003 | Appelman et al. | 709/206 |
| 6,614,451 B1 | * | 9/2003 | Hudson et al. | 715/759 |

(Continued)

FOREIGN PATENT DOCUMENTS

JP    2002-117153    4/2002

OTHER PUBLICATIONS

Hajime Ohashi, "Ring-gata Setsuzoku Onsei Tachiten Kaigi System ni okeru Data Denso Kino no Kento", The Institute of Electronics, Information and Communication Engineers 2000 Nen Tsushin Society Taikai Koen Ronbunshu 2, The Institute of Electronics, Information and Communication Engineers, Sep. 7, 2000, p. 159.

(Continued)

*Primary Examiner*—Doug Hulton
*Assistant Examiner*—Soumya Dasgupta
(74) *Attorney, Agent, or Firm*—Hogan & Hartson LLP

(57) ABSTRACT

To provide a reaction information display system that makes it possible, although simple in constitution without using special equipment, to grasp, easily in real time, the reaction, from a large number of users, to a single piece of evaluated object information supplied through an information communication network. A evaluated object information transmission means 16 transmits evaluated object information. A reaction information display means 13 of a provider side terminal device 4 receives through the information communication network 8 the reaction information made to correspond to the user side terminal device 6 and transmitted as a result of a user side input operation device 31 being operated in reaction to the evaluated object information transmitted from a evaluated object information transmission means 16 and received with a user side terminal device 6 through the information communication network 8 and displayed on a user side display device 32, and displays information, corresponding to the received reaction information, on a provider side display device 12.

14 Claims, 19 Drawing Sheets

U.S. PATENT DOCUMENTS

| | | | |
|---|---|---|---|
| 6,647,119 B1 * | 11/2003 | Slezak | 381/17 |
| 7,124,372 B2 * | 10/2006 | Brin | 715/751 |
| 7,127,685 B2 * | 10/2006 | Canfield et al. | 715/842 |
| 2003/0167449 A1 * | 9/2003 | Warren et al. | 715/531 |
| 2006/0084477 A1 * | 4/2006 | Wardimon et al. | 455/566 |

OTHER PUBLICATIONS

Takuhiro Kimura et al., "Zemi Keishiki no Kyodo Gakushu o Shien suru System no Sekkei", Information Processing Society of Japan Kenkyu Hokokusho, Information Processing Society of Japan, Dec. 19, 1997, vol. 97, No. 125, pp. 39 to 46.

Akihiro Hatanaka et al., "Kogi no Kiroku no Saisei ni Kansuru Gakseikan no Joho Kyoyu Shien", Information Processing Society of Japan Dai 57 Kai (Heisei 10 Nen Koki), Zenkoku Taikai Koen Ronbunshu (4), Information Processing Society of Japan, pp. 4-5 to 4-8.

* cited by examiner

Fig.13

| Reception time | Type of info | Info contents |
|---|---|---|
| 34481118 | On-blackboard info | Pen point shape: #oval 1<br>Color option:[Ink used:Semi-transparent;<br>Color:Black]<br>strokeinfo:[(66, 44), (68, 43), (68, 42), ....] |
| 34553368 | Choice display instruction | Choice number: 1<br>Choice item: "1. Great" |
| 34756628 | Reaction info | Transmission origin ID:"STU01"<br>Reaction contents: "I see" |
| 34971138 | Choice display instruction | Transmission origin ID:"KOUSI01"<br>Address ID: "STU03"<br>Choice number: 2<br>Choice contents: "2. Equal" |
| ... | ... | ... |

| Transmission time | Demanded info type | Demanded info items |
|---|---|---|
| 3448600 | Graphic info | Start time: 0<br>Time interval: 3600<br>Number of pages: 7 |

Fig.14B

| Transmission time | Demanded info type | Demanded info items |
|---|---|---|
| 3448600 | Reaction info | Subject user ID: All users<br>Start time: 0<br>Time interval: 3600<br>Number oh pages: 7 |

REACTION INFORMATION DISPLAY SYSTEM

TECHNICAL FIELD

This invention relates to a reaction information display system or the like, in particular to a technique for displaying reaction information in a system having a provider side terminal device and a user side terminal device that can make communication through an information communication network.

BACKGROUND ART

A learning system is known that transmits a teacher's image and voice in real time through a network to a large number of students. With such a learning system, though simple, students, while staying at home, can receive the same lecture as that given in the classroom. With such a conventional learning system, however, because individual student's reaction does not reach the teacher giving lecture, students' reaction cannot be fed back to the lecture like with the teaching in the classroom.

On the other hand, as a network type of learning system that can grasp the students' reaction is proposed in which a network type of multi-user virtual space is used (JP-A-H 8-212173). This system defines a virtual space in which a plural number of learning steps and respective students are displayed as objects, so that one can observe at the teacher terminal the students' situation as they move along in the virtual space with the progress of the learning step.

Another network type of system is also proposed in which a TV camera is placed at the students' terminals, so that students' facial expressions can be observed at the teacher terminal.

However, the former system requires a complicated system configuration and, on top of that, the system is not the one that realizes the form of lecture normally given in classrooms in which reactions of many students receiving the same lecture contents are fed back in real time. Moreover, the latter system requires special equipment such as TV cameras and broad band lines at the terminals of all the students and, on top of that, because of enormous amount of information, transmission of information becomes slow. Further, due to the limit to the network load, the number of students that can be displayed simultaneously at the teacher terminal is limited. Thus, with the increase in the number of students, it becomes impossible to grasp reactions of all the students in real time like in the classroom.

DISCLOSURE OF THE INVENTION

An object of this invention is to provide a reaction information display system that, although simple in constitution without using special equipment, can solve the above problems with the conventional learning system using the network as described above and grasp in real time many users' reaction to a single piece of evaluated object information presented through an information communication network.

A reaction information display system according to this invention includes:

a provider side terminal device having a provider side display device, and a plural number of user side terminal devices, each having a user side input operation device and a user side display device, and capable of communicating through an information communication network with the provider side terminal device, characterized in that the provider side terminal device has a evaluated object information transmission means for transmitting evaluated object information, the user side terminal device has a evaluated object information display means for receiving and displaying the evaluated object information transmitted from the provider side terminal device through the information communication network on the user side display device, and a reaction information transmission means for transmitting reaction information made to correspond to the user side terminal device when the user side input operation device is operated in reaction to the evaluated object information displayed, and the provider side terminal device further has a reaction information display means for receiving reaction information transmitted from the user side terminal device through the information communication network and for displaying information corresponding to the received reaction information on the provider side display device.

The provider side terminal device according to this invention is the provider side terminal device used in a system including:

the provider side terminal device having a provider side display device, and a plural number of user side terminal devices each having a user side input operation device and a user side display device, and capable of communicating through an information communication network with the provider side terminal, characterized by including:

a evaluated object information transmission means for transmitting evaluated object information, and a reaction information display means for receiving through the information communication network the reaction information, made to correspond to the user side terminal device, transmitted as a result of the user side input operation device being operated in reaction to the evaluated object information transmitted with the evaluated object information transmission means and received through the information communication network with the user side terminal device and displayed on the user side display device, and for displaying information corresponding to the received reaction information on the provider side display device.

The user side terminal device according to this invention is the user side terminal device used in a system including:

the provider side terminal device having the provider side display device, and a plural number of user side terminal devices, each having the user side input operation device and the user side display device, and capable of communicating through the information communication network with the provider side terminal, characterized by including:

a evaluated object information display means for receiving through the information communication network the evaluated object information transmitted from the provider side terminal device and for displaying the received information on the user side display device, and a reaction information transmission means for transmitting reaction information when the user side input operation device is operated in reaction to the displayed evaluated object information, so that information, made to correspond to the user side terminal device and corresponding to the reaction information, transmitted through the information communication network to the provider side terminal device, is displayed on the provider side display device.

A computer program according to this invention is characterized by causing a provider side terminal device used in a system including:

a provider side terminal device having a provider side display device, and a plural number of user side terminal devices each having a user side input operation device and a user side display device, and capable of communicating through an information communication network with the provider side terminal, to function as:

a evaluated object information transmission means for transmitting evaluated object information, and a reaction information display means for receiving reaction information made to correspond to the user side terminal device transmitted through the information communication network when the user side input operation device is operated in reaction to the evaluated object information transmitted from the evaluated object information transmission means and received with the user side terminal device through the information communication network and displayed on the user side display device, and for displaying information corresponding to the received reaction information on the provider side display device.

A computer program according to this invention is characterized by causing a user side terminal device used in a system including:

a provider side terminal device having a provider side display device, and a plural number of user side terminal devices each having a user side input operation device and a user side display device, and capable of communicating through an information communication network with the provider side terminal, to function as:

a evaluated object information display means for receiving evaluated object information transmitted from the provider side terminal device through the information communication network and displaying the received information on the user side display device, and a reaction information transmission means for transmitting reaction information when the user side input operation device is operated in reaction to the displayed evaluated object information, so that information, made to correspond to the user side terminal device and corresponding to the reaction information and transmitted through the information communication network to the provider side terminal device, is displayed on the provider side display device.

While the features of the invention are broadly described above, its configuration and details together with its objects and features will become more apparent along with the following disclosure in reference to appended drawings.

BRIEF DESCRITPION OF DRAWINGS

FIG. 1 shows a constitution of a reaction information display system 2 as an embodiment of the invention.

FIG. 2 is a block diagram of constitution of a provider side terminal device 4 and a communication information memory device 10 that constitute the reaction information display system 2 shown in FIG. 1.

FIG. 13 shows an example of data constitution of a communication information database 80.

FIG. 14A shows an example of data constitution of evaluated object information demand signal used in communication information reproduction process.

FIG. 14B shows an example of data constitution of reaction information demand signal used in communication information reproduction process.

BEST MODE FOR CARRRYING OUT THE INVENTION

Figure 1:
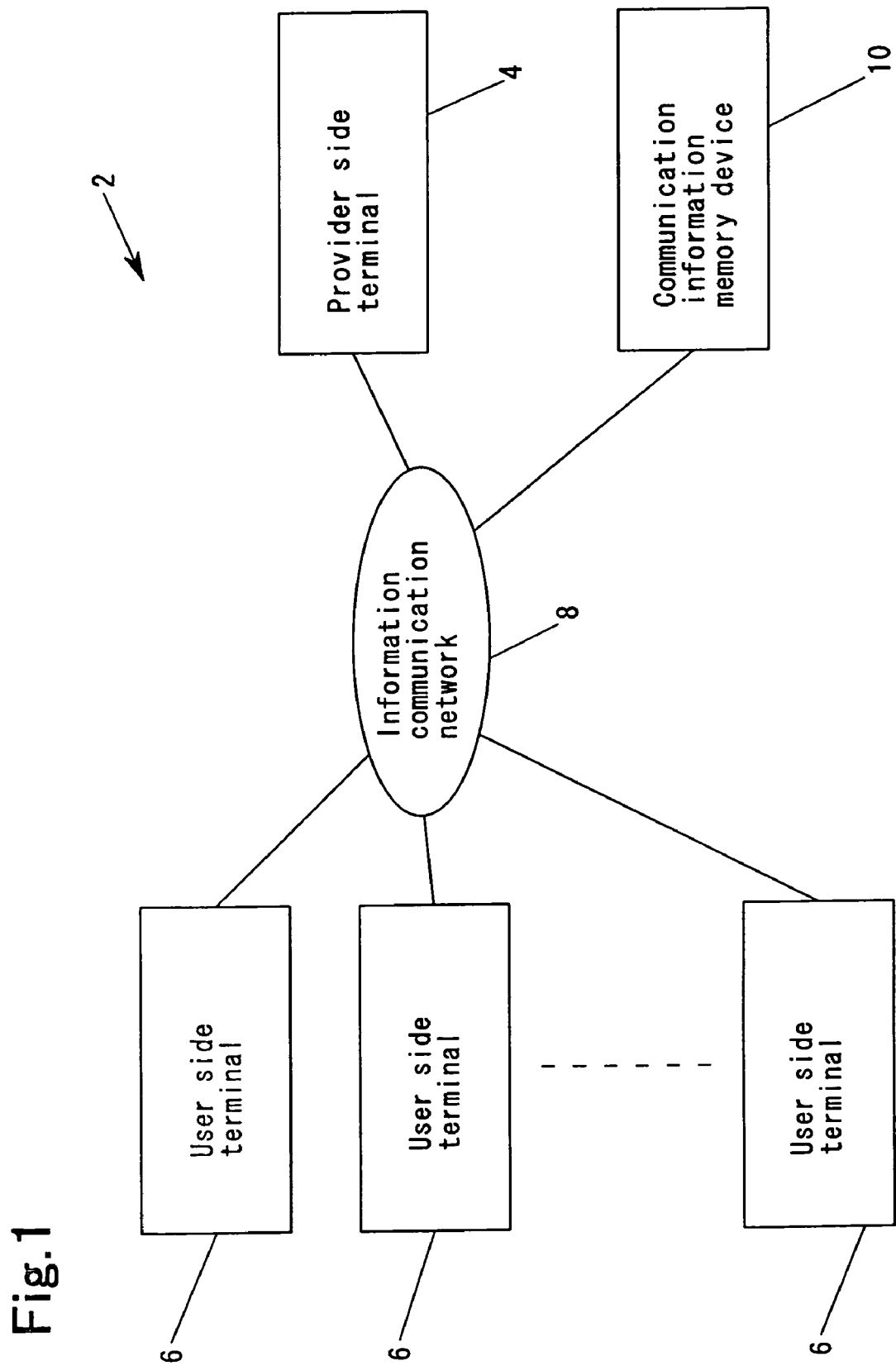

FIG. 1 shows a constitution of a reaction information display system 2 as an embodiment of the invention. In the reaction information display system 2, the provider side terminal device 4 and a plural number of user side terminal devices 6 are made mutually communicable through an information communication network 8.

Figure 2:
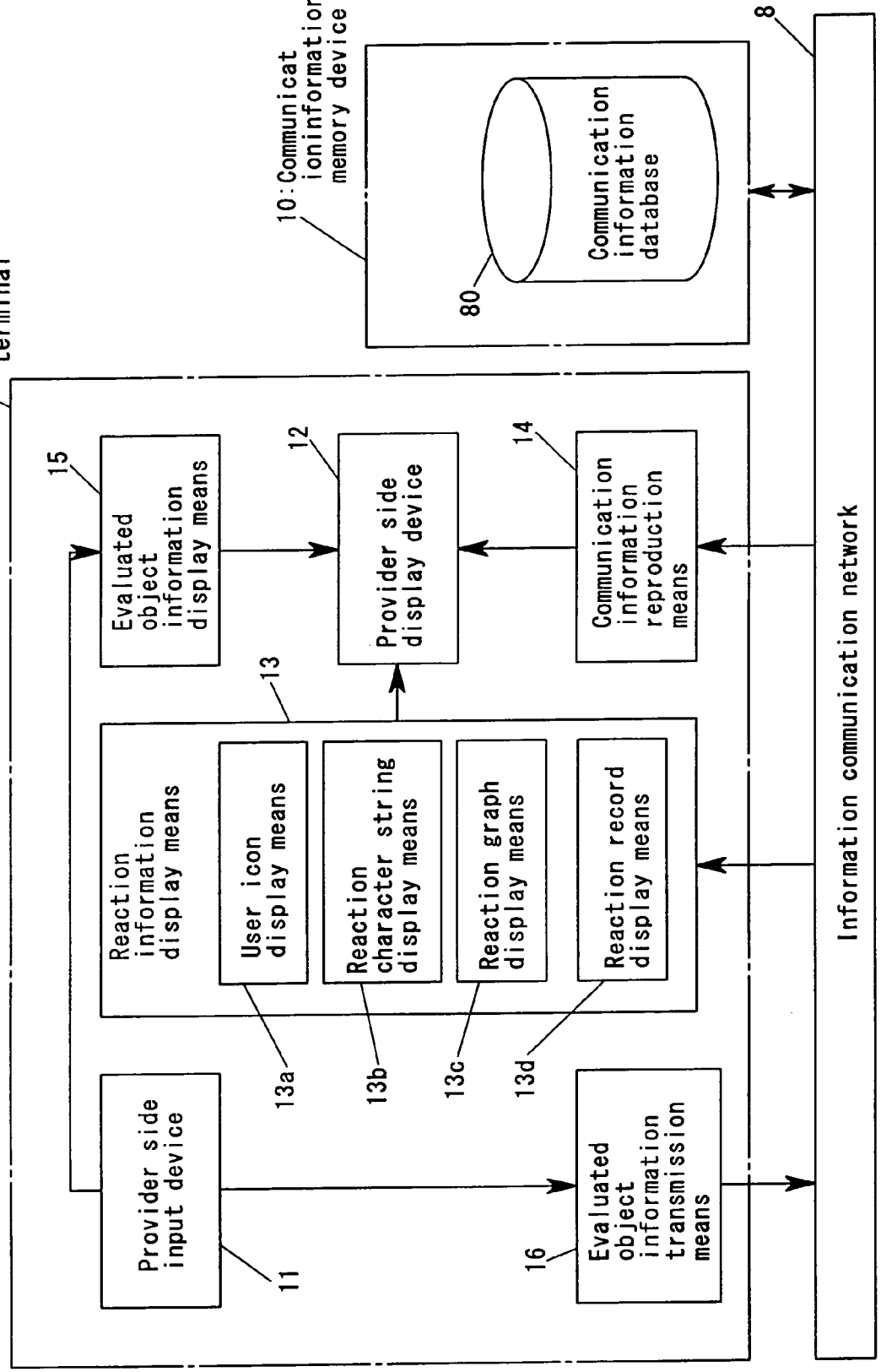
Figure 3:
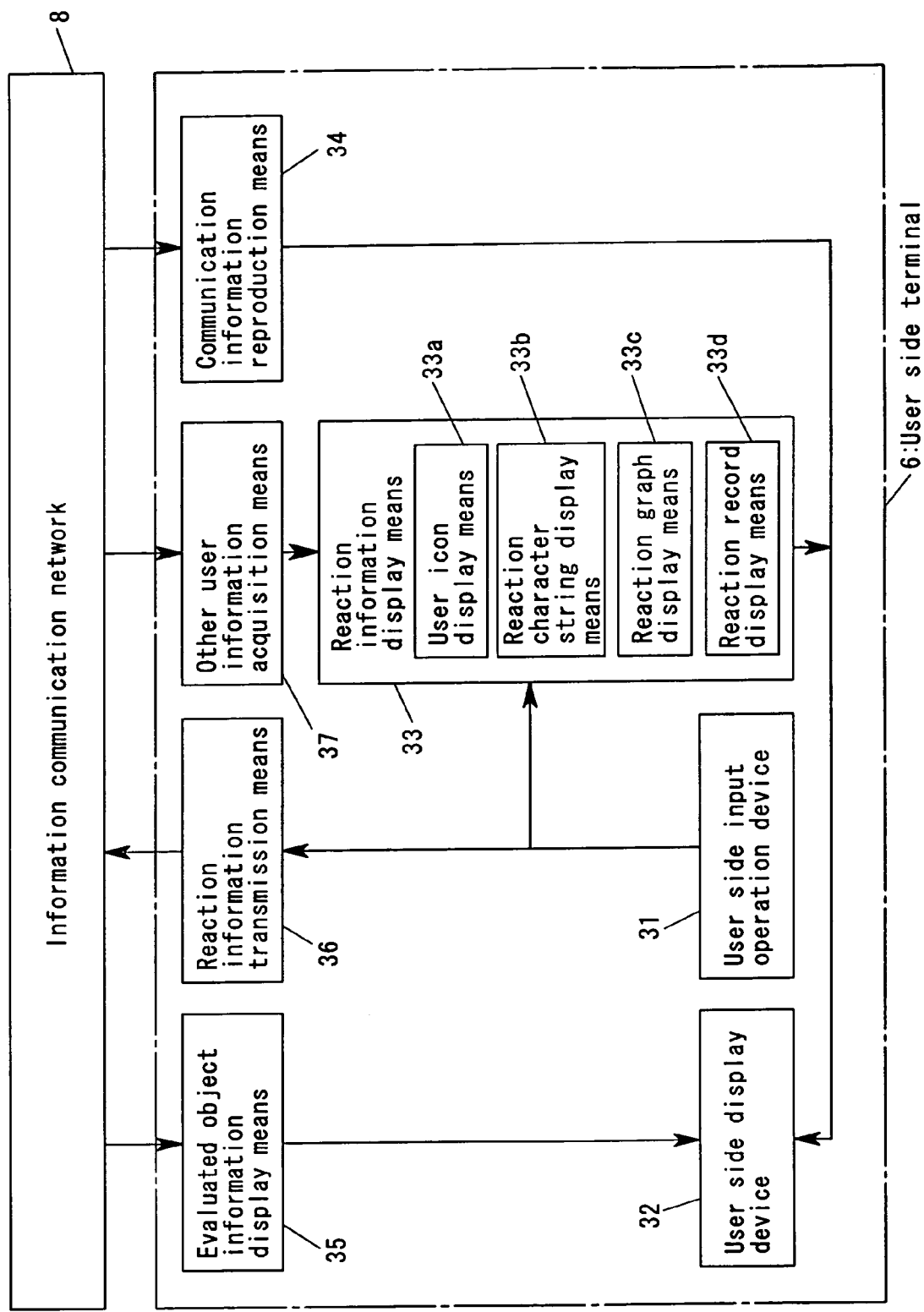
FIG. 3 is a block diagram of constitution of a user side terminal device 6 that constitutes the reaction information display system 2 shown in FIG. 1.

FIGS. 2 and 3 are block diagrams of the constitution, respectively, of the provider side terminal device 4 and the communication information memory device 10, and of the user side terminal device 6, that constitute the reaction information display system 2 shown in FIG. 1.

As shown in FIG. 2, the provider side terminal device 4 has a provider side input device 11, a provider side display device 12, a reaction information display means 13, a communication information reproduction means 14, a evaluated object information display means 15, and a evaluated object information transmission means 16.

The evaluated object information inputted through the provider side input device 11, while being displayed through the evaluated object information display means 15 on the provider side display device 12, is also transmitted through the evaluated object information transmission means 16.

The reaction information display means 13 receives the reaction information transmitted from the user side terminal device 6 through the information communication network 8 and at the same time displays information corresponding to the received reaction information on the provider side display device 12. The reaction information display means 13 has a user icon display means 13a, a reaction character string display means 13b, a reaction graph display means 13c, and a reaction record display means 13d.

The user icon display means 13a controls to define, on part of the provider side display device 12, a user icons collective display area in which a plural number of user icon display areas are put in order and to display, using icons, pieces of information corresponding to pieces of reaction information from respective user side terminal devices 6 in corresponding user icon display areas. This embodiment is arranged that the colors of user icons are changed according to the items of the reaction information.

The reaction character string display means 13b controls to display, on the provider side display device 12, character strings (for example, "I see." and "???") corresponding to the reaction information from the respective user side terminal devices 6. Therefore, it is easy to grasp what contents of reaction information are received. This embodiment is arranged to display the reaction character string and the icons simultaneously. Therefore, it is possible to grasp at a glance which user shows what contents of reaction.

The reaction graph display means 13c controls to display, using a graph on the provider side display device 12, statistical values of the reaction information from respective user side terminal devices 6, for example the frequency of reception of respective pieces of information. Therefore, it is easy to grasp the tendency of reaction from many users. This embodiment is arranged to simultaneously display the reaction graph, icons, and reaction character string. Therefore, it is possible to grasp at a glance which user has made what reaction together with the tendency of reaction from many users. Therefore, it is possible for the information provider to have the same feeling as in a scene with all the users in the same place, facing the information provider, seeing and listening to the evaluated object information.

The reaction record display means 13d controls to display a list of reaction information from the user side terminal devices 6 in time sequence on the provider side display device 12. This embodiment is arranged to display the details of the respective pieces of reaction information as related to the respective senders or users. Therefore, it is easy to grasp what response was (is) frequent in what time zone (for example currently) from which user.

The communication information reproduction means 14 acquires, while specifying communication time and information type, the whole or part of the information communicated between the terminals 4 and 6 and stored in a communication information database 80 (to be described later), and reproduces and displays information corresponding to the acquired information on the provider side display device 12.

The communication information memory device 10 has a communication information database 80 for storing information contents, related to communication time and type of information, communicated between the terminal devices constituting the system 2, namely between the provider side terminal device 4 and a plural number of user side terminals 6.

Next, as shown in FIG. 3, the user side terminal device 6 has: a user side input operation device 31, a user side display device 32, a reaction information display means 33, a communication information reproduction means 34, a evaluated object information display means 35, a reaction information transmission means 36, and an other user information acquisition means 37.

The evaluated object information display means 35 receives evaluated object information transmitted from the provider side terminal device 4 through the information communication network 8 and displays it on the user side display device 32.

The reaction information transmission means 36, when the user side input operation device 31 is operated in reaction to the evaluated object information displayed on the user side display device 32, transmits reaction information made to correspond to the user side display device 32.

The other user information acquisition means 37 receives reaction information transmitted from other user side terminal device 6 through the information communication network 8.

The reaction information display means 33, concerning the reaction information received from other user through the other user information acquisition means 37 and own reaction information created by the operation on the own user side input operation device 31, displays the information corresponding to the reaction information on the own user side display device 32. The reaction information display means 33 has: a user icon display means 33a, a reaction character string display means 33b, a reaction graph display means 33c, and a reaction record display means 33d.

The user icon display means 33a, the reaction character string display means 33b, the reaction graph display means 33c, and the reaction record display means 33d are the same in constitution as the user icon display means 13a, the reaction character string display means 13b, the reaction graph display means 13c, and the reaction record display means 13d of the reaction information display means 13 of the provider side terminal device 4 shown in FIG. 2 except for displaying the information corresponding to the reaction information on the own user side display device 32.

Therefore, it is possible for each user to share the same feeling as if all the users were present in the same place facing the information provider to watch and listen to the evaluated object information.

The communication information reproduction means 34 acquires, while specifying communication time and type of information, the whole or part of the information communicated between the terminals 4 and 6 and stored in the communication information database 80 of the communication information memory device 10, and reproduces and displays information corresponding to the acquired information on the user side display device 32.

FIGS. 4 to 19 are illustrations or explaining an example in which the reaction information system 2 is applied to remote teaching.

Figure 4:
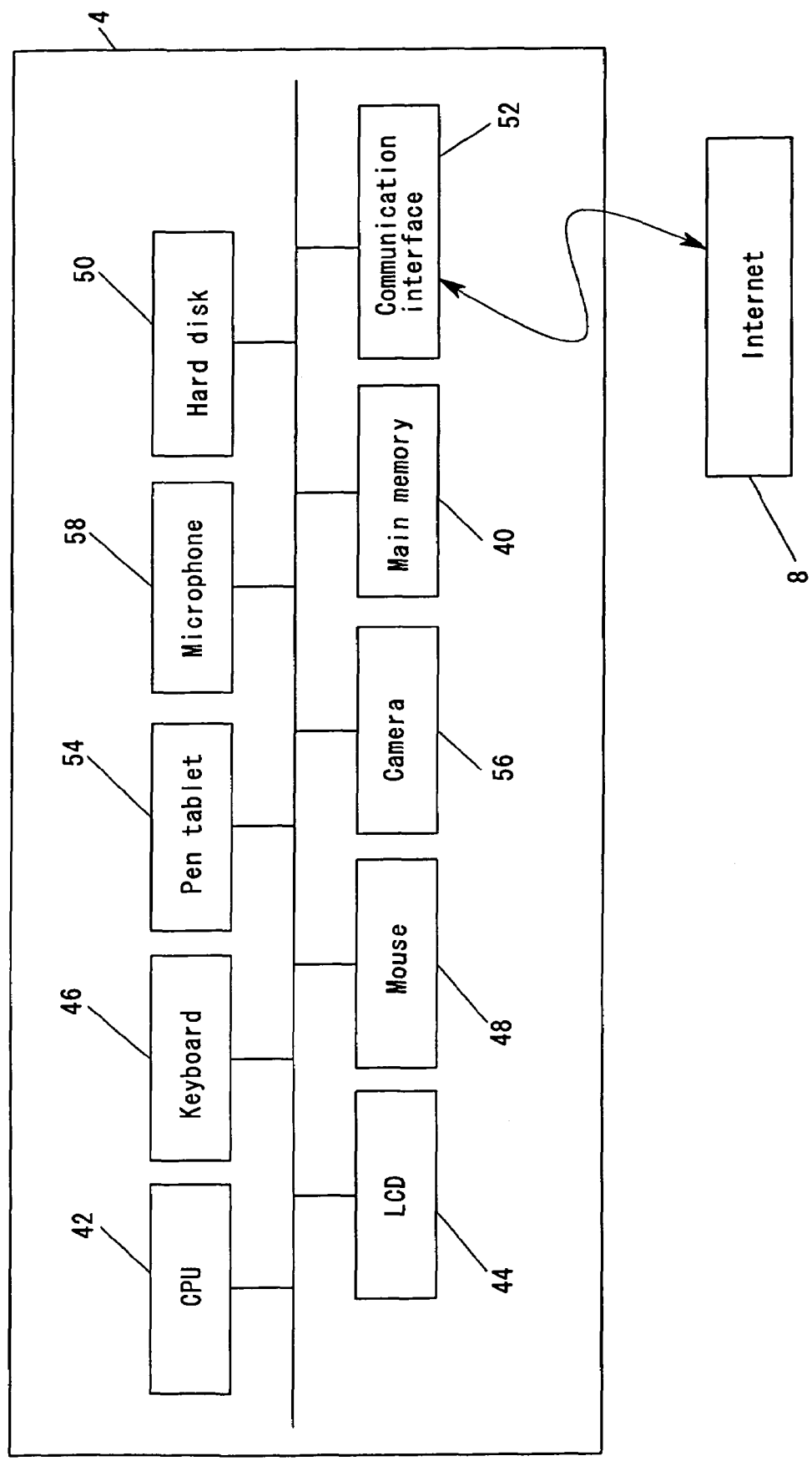
FIG. 4 is a block diagram for explaining the hardware constitution of a teacher terminal 4 as the provider side terminal device 4.
Figure 5:
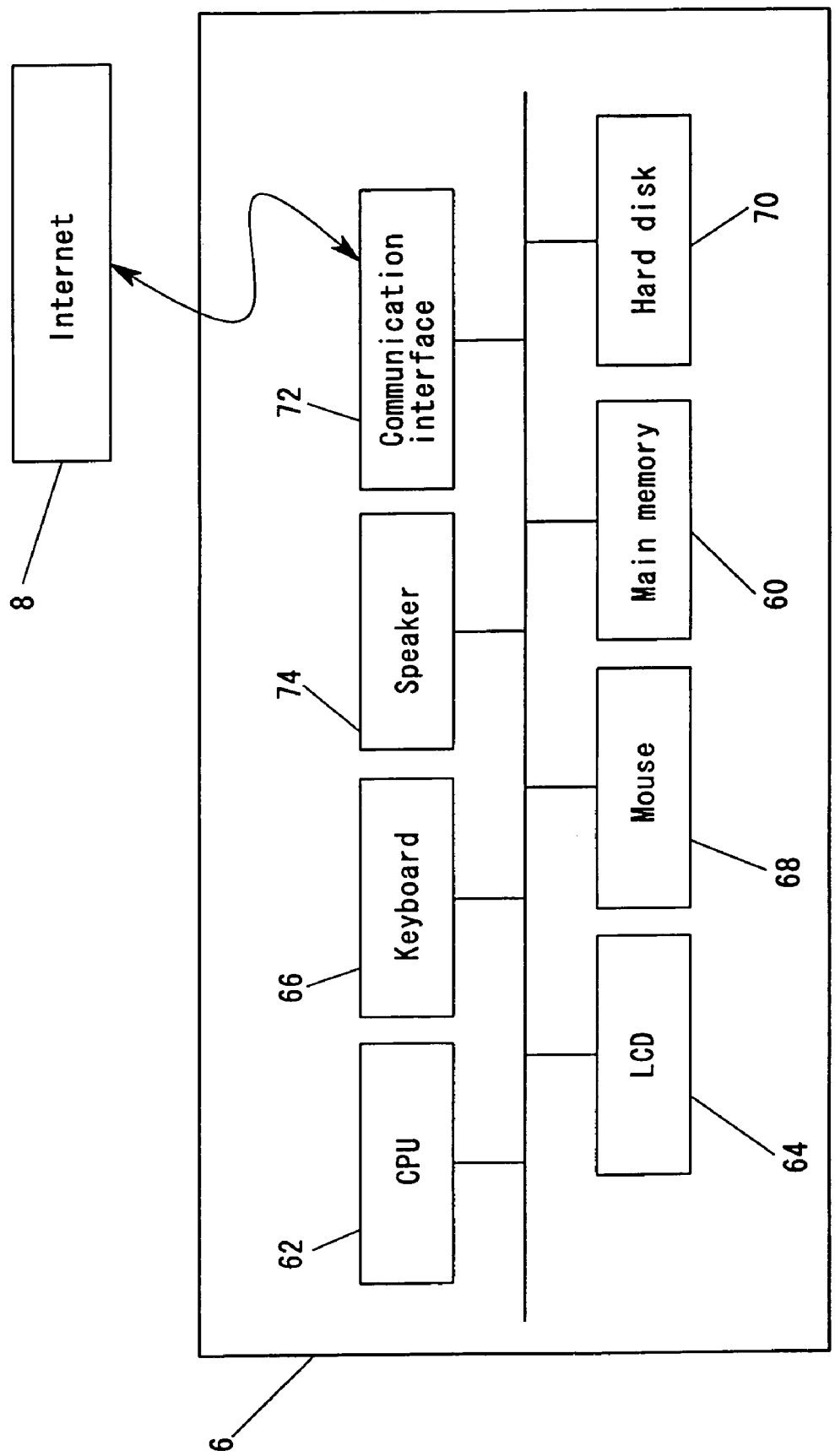
FIG. 5 is a block diagram for explaining the hardware constitution of a student terminal 6 as the user side terminal device 6.
Figure 6:
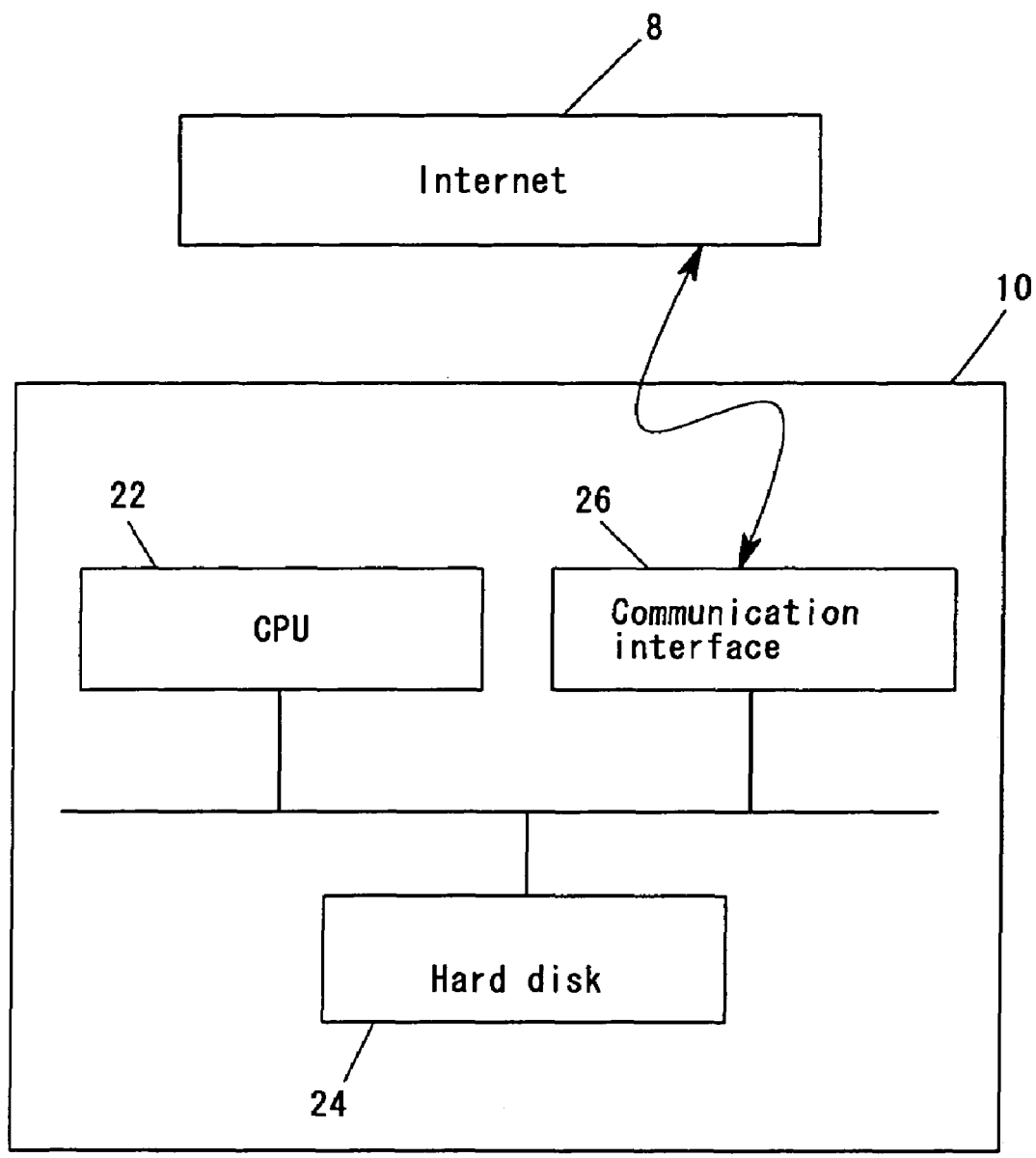
FIG. 6 is a block diagram for explaining the hardware constitution of a data control server 10 as the communication information memory device 10.

FIGS. 4, 5, and 6 are respectively block diagrams for explaining the hardware constitution of the teacher terminal 4 as the provider side terminal device 4, the student terminal 6 as the user side terminal device 6, and the data control server 10 as the communication information memory device 10.

As shown in FIG. 4, the teacher terminal 4 has: a hard disk 50 as a memory means or memory medium with a program of the teacher terminal 4 side recorded thereon; a CPU 42 as a control means that loads the program recorded on the hard disk 50 onto a main memory 40 and executes it; the LCD (liquid crystal display) 44 as the provider side display devices 12; the provider side input devices 11 including: a keyboard 46, a mouse 48, a pen tablet 54, a camera 56 and a microphone 58; and a communication interface 52 for communicating with the student terminals 6 and the data control server 10 through the Internet 8 as the information communication network 8.

As shown in FIG. 5, the student terminal 6 is a general purpose, personal computer having: the provider side display device 32 including the LCD 64 and a speaker 74, the user side input operation device 31 including the keyboard 66 and a mouse 68, a recording medium or a hard disk 70 for recording a program such as an OS (operation system), a CPU 62 that loads the program recorded on the hard disk 70 onto a main memory 60 and executes it, and a communication interface 72 for communicating with the teacher terminal 4, other student terminals 6 and the data control server 10 through the Internet 8.

In case a student wants to attend a lecture in this embodiment, the student can access through the Internet 8 to a program distribution server (not shown). Then, a program for the student terminal 6 side of this system is automatically loaded onto the main memory 60 of the student terminal 6 and executes it. Therefore, the main memory 60 may also be taken as a recording medium on which is recorded the program on the student terminal 6 side of the system. When attending the lecture is over, the program is automatically erased.

As shown in FIG. 6, the data control server 10 has a hard disk 24 or a recording medium on which are recorded at least an OS and a program for database, a CPU 22 for running the program or the like recorded on the hard disk 24, and a communication interface 26 for communicating with the teacher terminal 4 and the student terminals 6.

Figure 7:
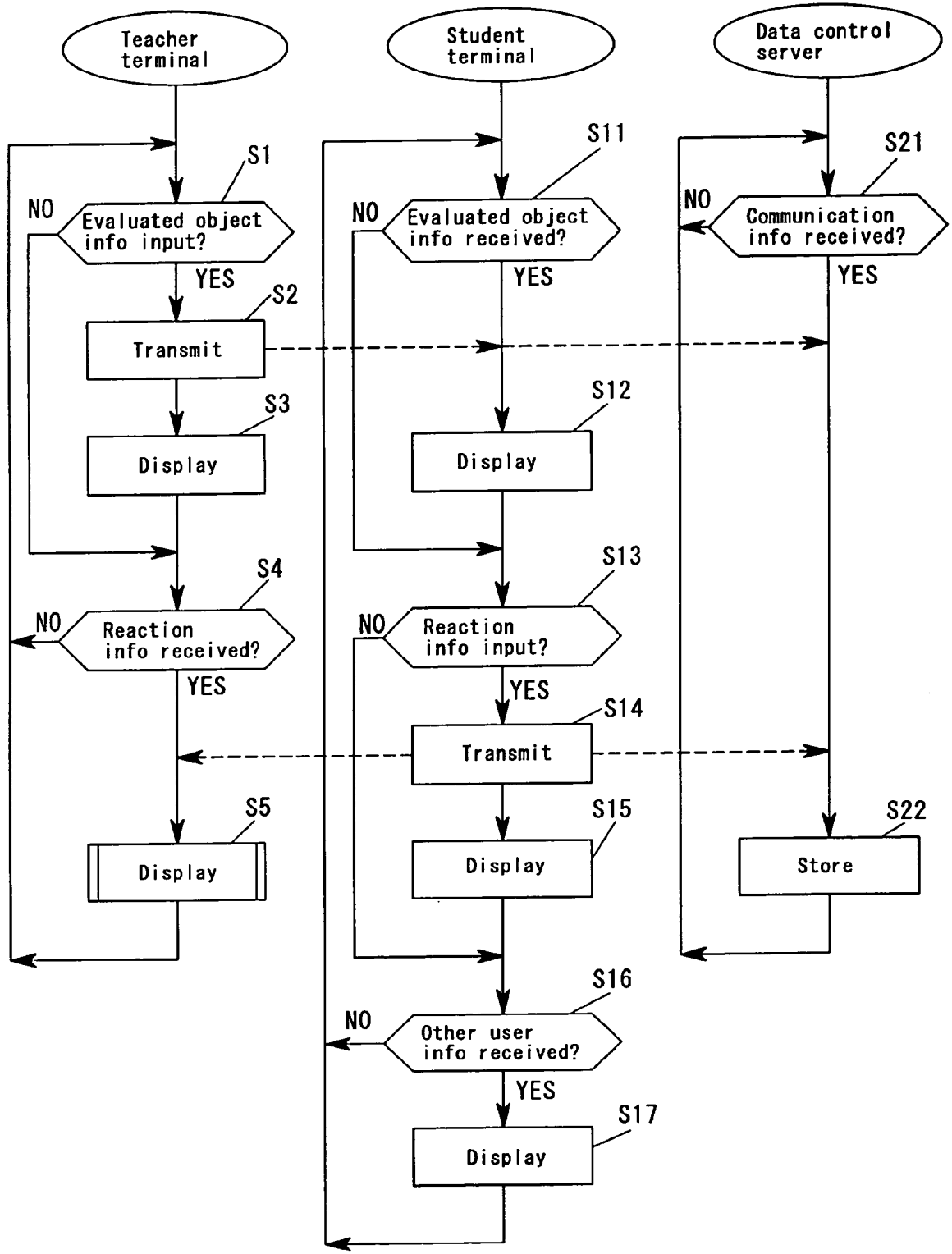
FIG. 7 is an example flowchart of the flow of reaction information display process.
Figure 8:
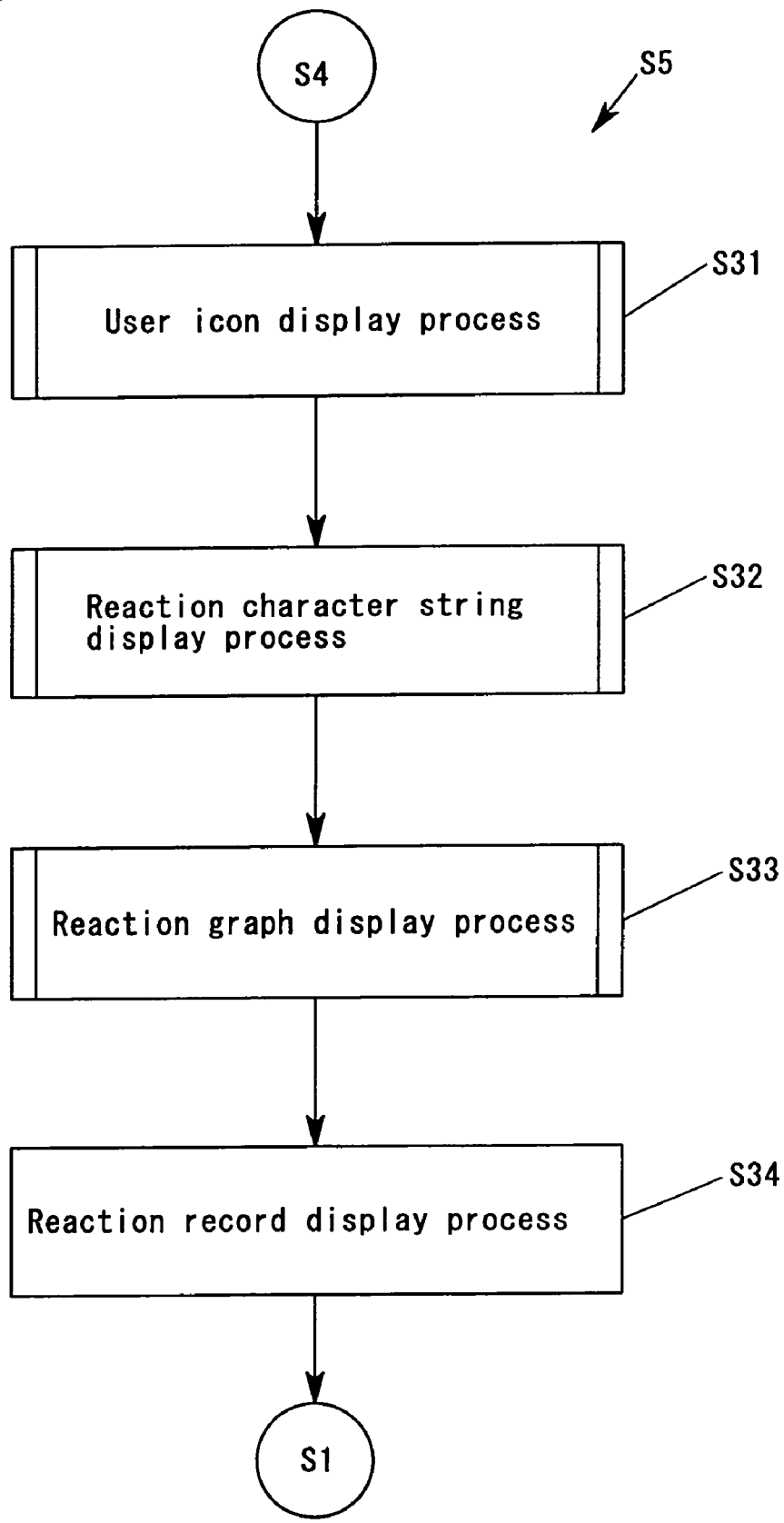
FIG. 8 is a flowchart in detail of part of the process shown in FIG. 7.
Figure 9:
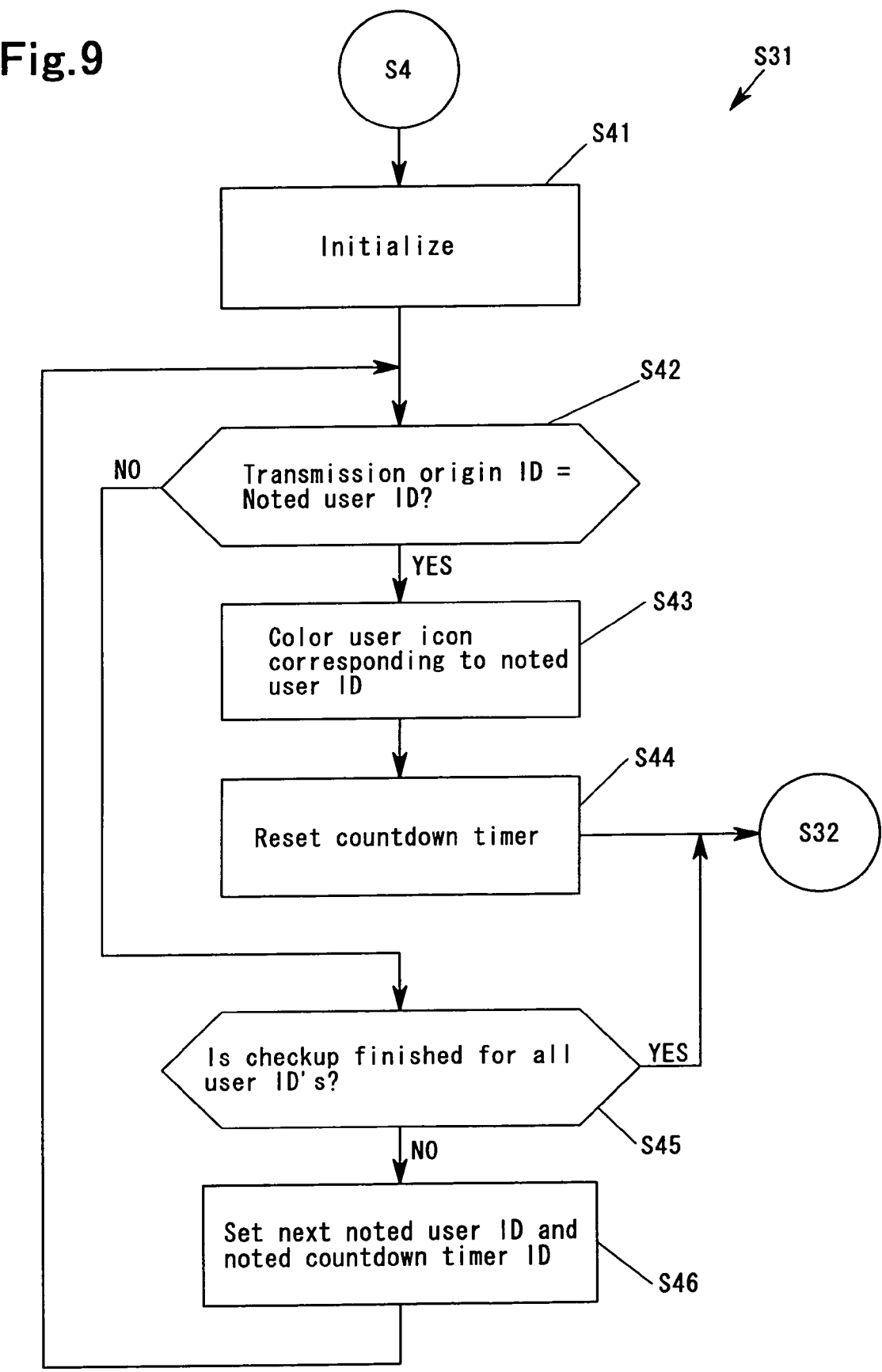
FIG. 9 is a flowchart in detail of part of the process shown in FIG. 8.
Figure 10:
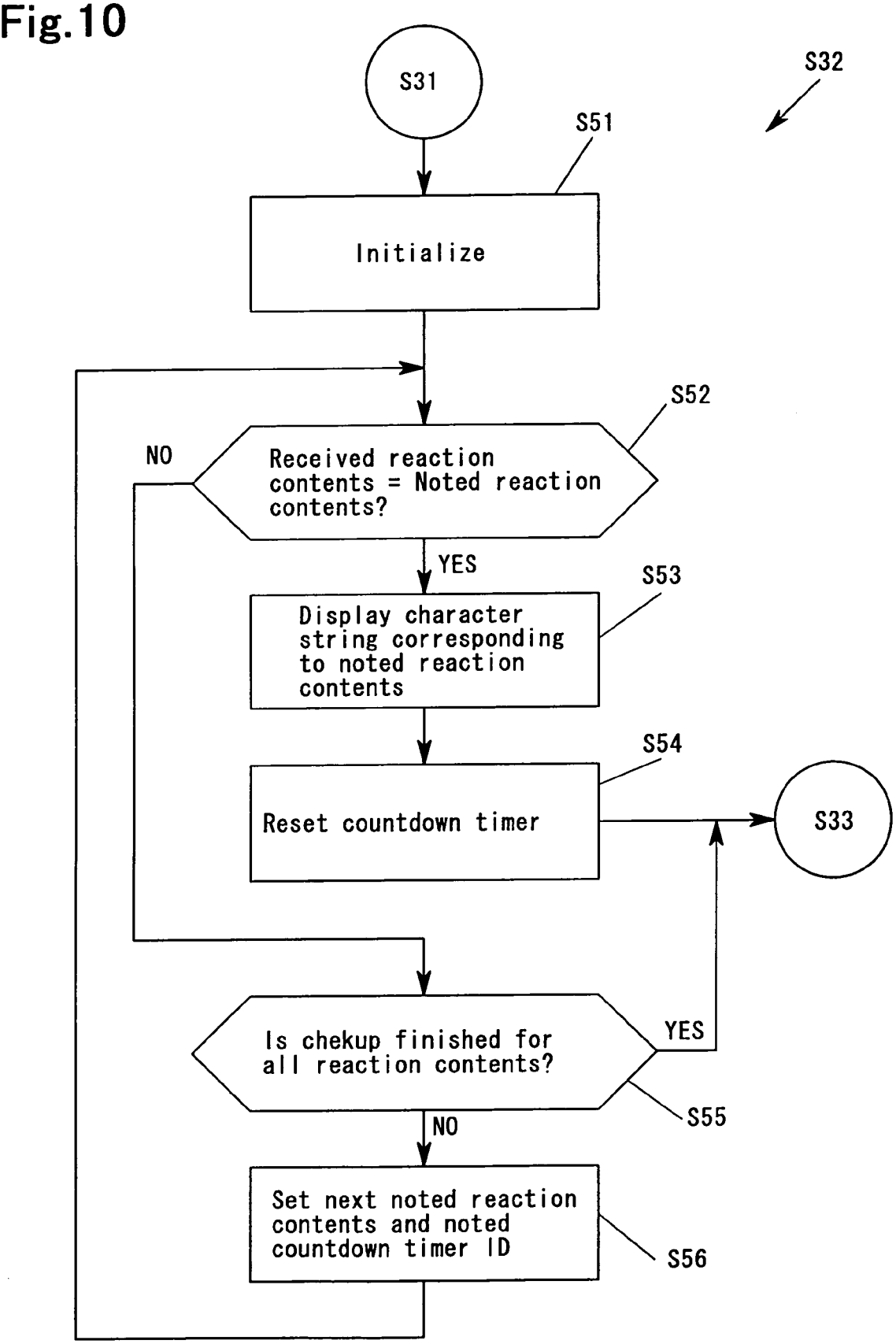
FIG. 10 is a flowchart in detail of another part of the process shown in FIG. 8.
Figure 11:
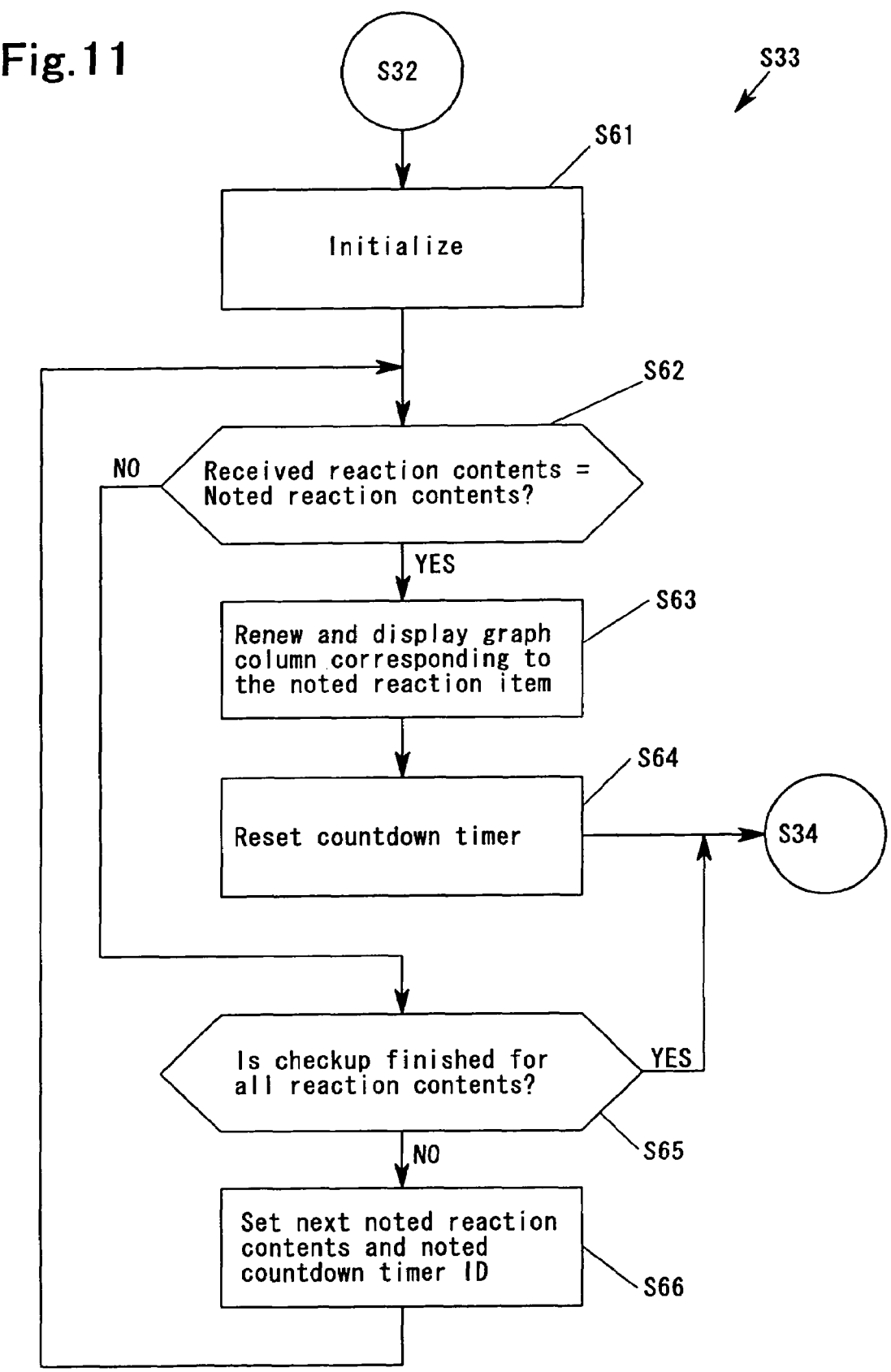
FIG. 11 is a flowchart in detail of still another part of the process shown in FIG. 8.
Figure 12:
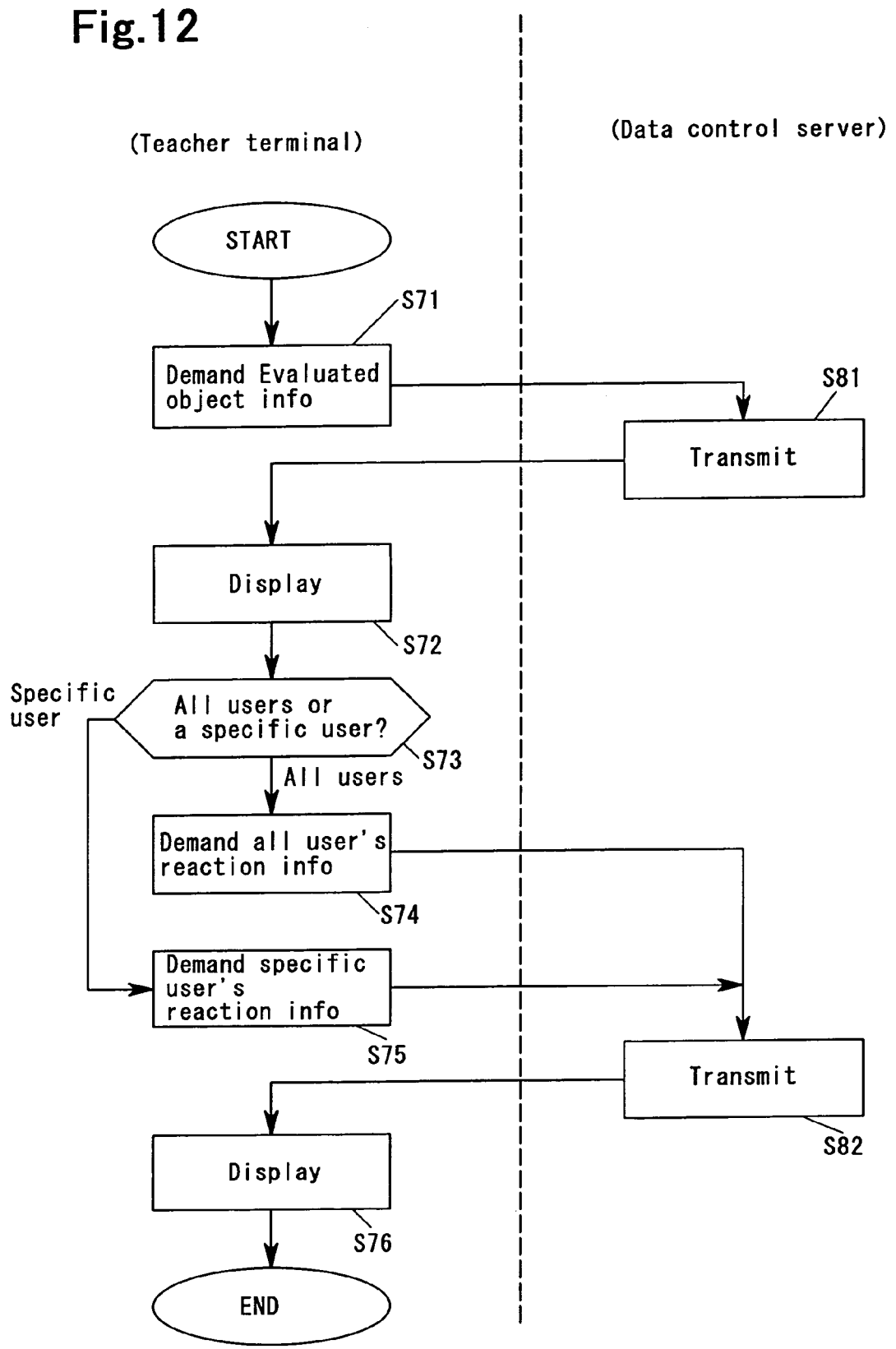
FIG. 12 is an example flowchart of the flow of communication information reproduction process.

Next, FIG. 7 is an example flowchart of the flow of reaction information display process. FIG. 8 shows partial details of the process flowchart shown in FIG. 7. FIGS. 9 to 11 show partial details of the process shown in FIG. 8. FIG. 12 is an example flowchart of the flow of communication information reproduction process.

FIG. 13 shows an example of data constitution in the communication information database 80. FIGS. 14A and 14B show examples of data constitution of the evaluated object information demand signal and reaction information demand signal, respectively, used in communication information reproduction process.

Figure 15:
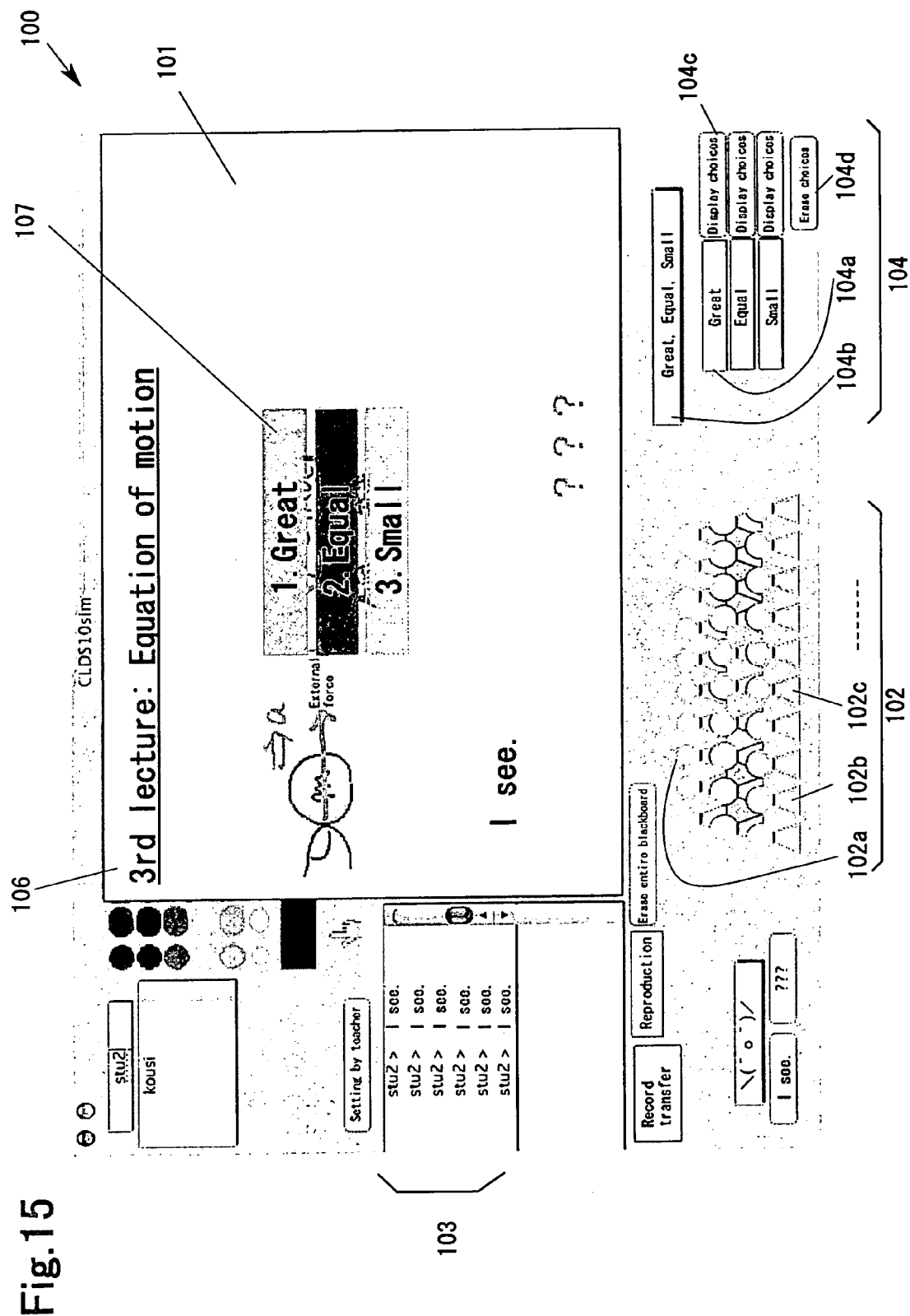
FIG. 15 is for explaining the appearance of a display screen 100 of an LCD 44 of a teacher terminal 4 in the reaction information display process.
Figure 16:
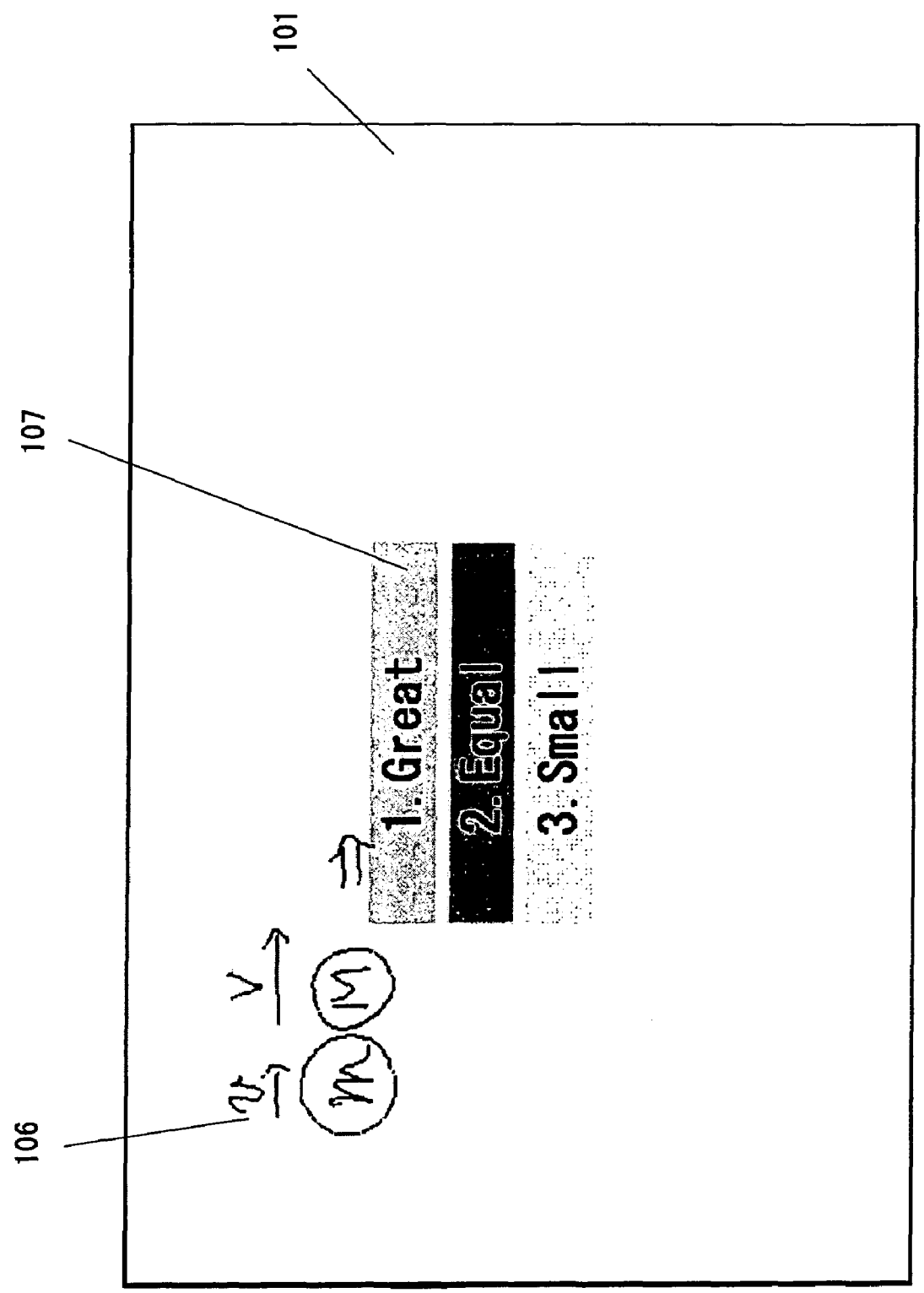
FIG. 16 is another view for explaining the appearance of the display screen 100 of the LCD 44 of the teacher terminal 4 in the reaction information display process.
Figure 17:
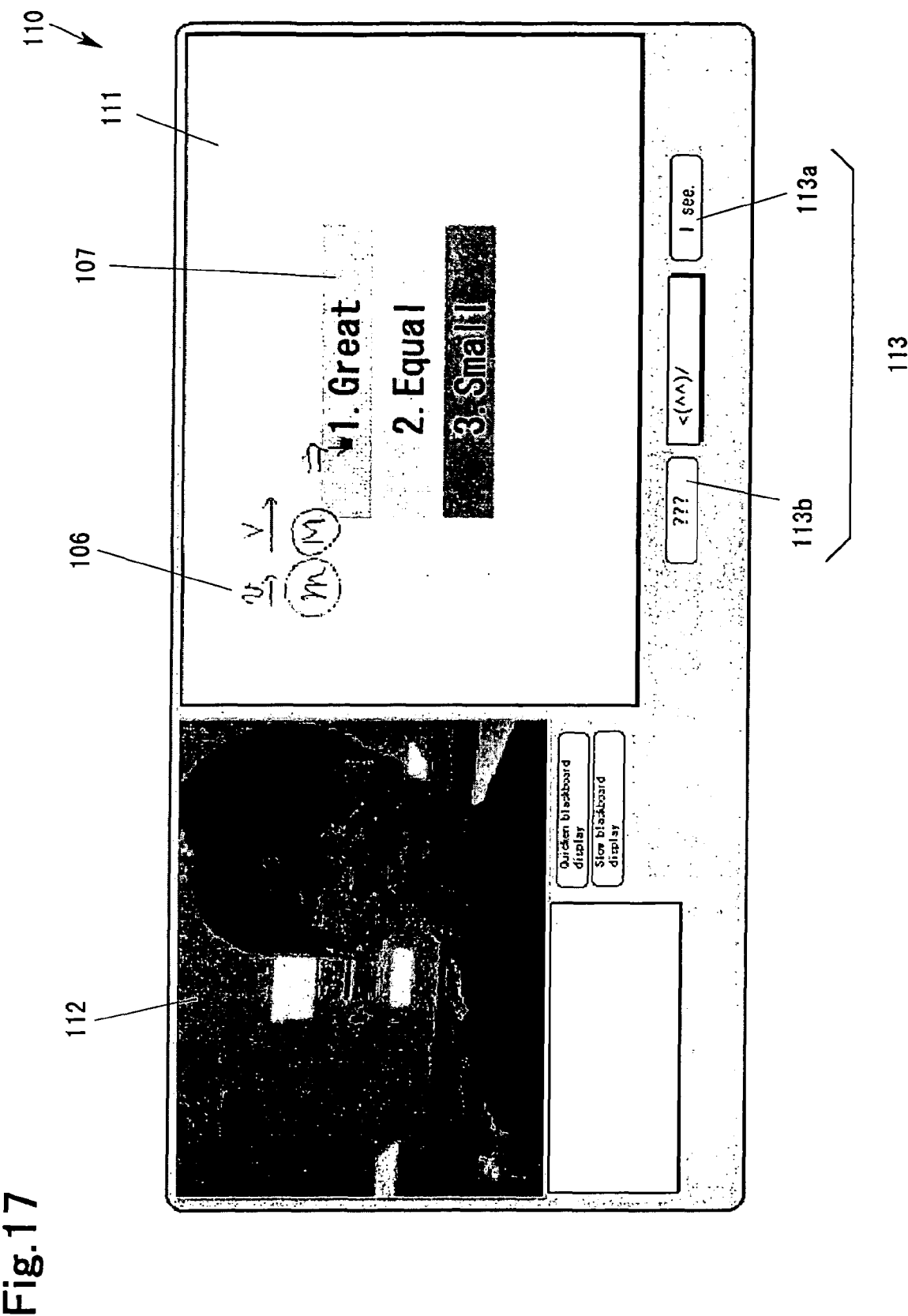
FIG. 17 is for explaining the appearance of a display screen 110 of an LCD 64 of a student terminal 6 in the reaction information display process.
Figure 18:
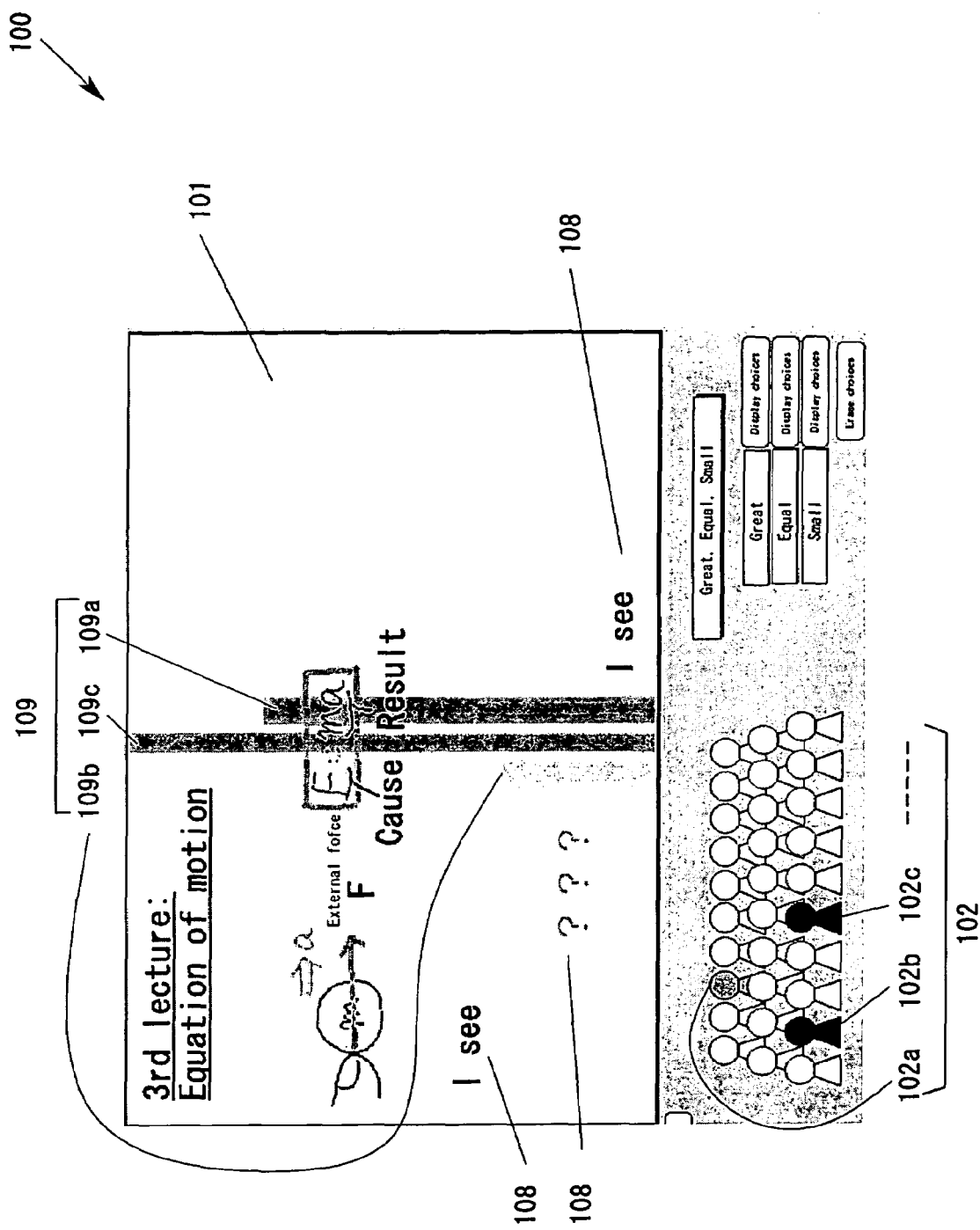
FIG. 18 is still another view for explaining the appearance of the display screen 100 of the LCD 44 of the teacher terminal 4 in the reaction information display process.
Figure 19:
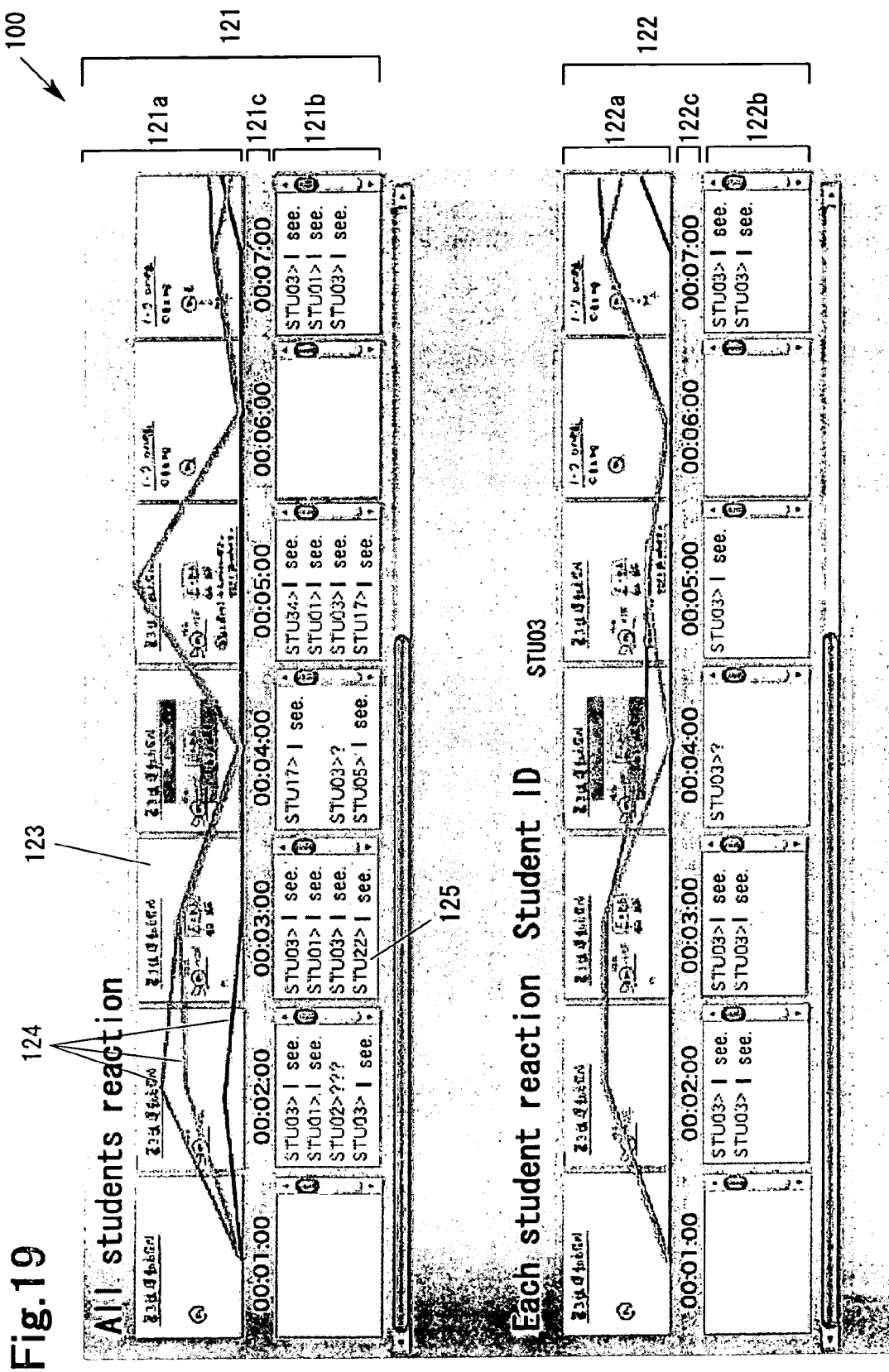
FIG. 19 is for explaining the appearance of the display screen 100 of the LCD 44 of the teacher terminal 4 in the communication information reproduction process.

FIGS. 15, 16, and 18 are illustrations for explaining the appearance of the display screen 100 of the LCD 44 of the teacher terminal 4 in the reaction information display process. FIG. 17 is a drawing for explaining the appearance of the display screen 110 of the LCD 64 of the student terminal 6 in the reaction information display process. FIG. 19 is a drawing for explaining the appearance of the display screen 100 of the LCD 44 of the teacher terminal 4 in the communication information reproduction process.

The reaction information display process and the communication information reproduction process are described in reference to FIGS. 4 to 19 for the case in which the reaction information display system 2 is applied to the remote teaching.

First, the CPU 42 of the teacher terminal 4 shown in FIG. 4 is monitoring, as shown in FIG. 7, whether or not evaluated object information is inputted, and in case the evaluated object information is not inputted, moves the control to the step S4 (step S1).

The evaluated object information and its input method are described. The evaluated object information is the information as the subject of evaluation by the students, transmitted to the students or users. The students return the evaluation of the evaluated object information in the form of reaction information to the teacher, the provider of the evaluated object information. In this embodiment, the evaluated object information is assumed to include for example graphic information, image information, and voice information.

The graphic information is the information displayed on the graphic display area 111 constituting the display screen 110 of the LCD 64 of the student terminal 6 shown in FIG. 17. The graphic information includes for example on-blackboard information 106 and choice information 107.

The on-blackboard information 106 is the information such as characters, drawings, symbols, etc. handwritten by the teacher. While the method of inputting the on-blackboard information 106 is not limited particularly, the information is inputted for example from the pen tablet 54 constituting the teacher terminal 4 shown in FIG. 4. In that case, the teacher compares the pen tablet 54 for example to a whiteboard and writes on it.

The choice information 107 is the information indicating choices given from the teacher to the students. Normally, a set of pieces of choice information 107, 107, ... inputted from the teacher terminal 4 are displayed on the graphic display area 111 constituting the display screen 110 of the LCD 64 of the student terminals 6. As described later, when any piece of the choice information 107 is clicked (chosen) at a student terminal 6, a piece of information indicating the chosen information 107 is transmitted as reaction information from the student terminal 6.

While the method of inputting the choice information 107 at the teacher terminal 4 is not limited particularly, it is inputted for example using the choice input area 104 constituting the display screen 100 of the LCD 44 of the teacher terminal 4 shown in FIG. 15. That is, the choice information 107 is set in the choice setting area 104*a* of the choice input area 104 and then the information 107 is inputted by clicking (choosing) a corresponding choice display button 104*c*.

Setting the choice information 107 in the choice setting areas 104*a* may be made by inputting character data directly into the choice setting area 104*a* using the keyboard 46. Alternatively, the setting may also be made by registering in advance sets of pieces of information frequently used (such as "great," "equal," and "small") in a choice registering area (not shown) of the hard disk 50, choosing a required set of choices from among the plural number of pieces of choice information displayed on a registered choice display area 104*b*, and setting them in the choice setting areas 104*a*, 104*a*, . . . .

Next, the image information is the information displayed on the image display area 112 constituting the display screen 110 of the LCD 64 of the student terminal 6 shown in FIG. 17. The image information includes for example animation (or movie) information and still picture information.

While the method of inputting the image information is not limited to a particular one, it is inputted for example from the camera 56 constituting the teacher terminal 4 shown in FIG. 4. The constitution of the camera 56 is not limited particularly but may be changed according to the type of the image information. In case the image information is animation information, for example a TV camera is used as the camera 56. In case the image information is still picture information, for example a digital camera is used. As a matter of course, prerecorded image information may be inputted through specific input means.

The voice information is the information outputted from the speaker 74 of the student terminal 6 shown in FIG. 5. While the method of inputting the voice information is not limited particularly, the information is inputted for example through the microphone 58 constituting the teacher terminal 4 shown in FIG. 4. As a matter of course, it is also possible to input prerecorded voice information through specific input means.

While the contents of the image information and the voice information are not limited particularly, they include for example facial expression, voice, etc. of the teacher giving a lecture.

Referring again to FIG. 7, when the evaluated object information is inputted at the teacher terminal 4 as described above, the CPU 42 of the teacher terminal 4 transmits the evaluated object information inputted through the interface 52 while displaying the whole or part of the information on the teacher terminal 4 (steps S2 and S3).

As shown in FIG. 16, with this embodiment, out of the evaluated object information transmitted, the on-blackboard information 106 and the choice information 107 constituting the graphic information is displayed on the graphic display area 101 constituting the display screen 100 of the LCD 44 of the teacher terminal 4.

The steps S2 and S3 in FIG. 7 respectively correspond to the evaluated object information transmission means 16 and the evaluated object information display means 15 in FIG. 2.

As shown in FIG. 7, the evaluated object information transmitted from the teacher terminal 4 is received through the Internet 8 with the student terminals 6. In other words, the CPU 62 of the student terminal 6 is monitoring whether or not the evaluated object information is received. In case the evaluated object information is not received, it moves the control to the step S13. In case the evaluated object information is received, it displays the information on the student terminal 6 (steps S11 and S12).

Of the evaluated object information received with the student terminal 6, voice information is reproduced with the speaker 74. Graphic information and image information are respectively displayed in the graphic display area 111 and the image display area 112 of the display screen 110 of the LCD 64 shown in FIG. 17.

The step S12 in FIG. 7 corresponds to the evaluated object information display means 35.

As shown in FIG. 7, the CPU 62 of the student terminal 6 is monitoring (step S13) whether or not reaction information to the evaluated object information displayed is inputted. In case the reaction information is inputted, the control goes to the step S16 (step S13).

While the mode and contents of the reaction information are not limited particularly, there are for example comprehension degree information indicating the degree of understanding by the student of the evaluated object information and choice answer information indicating the answer by the student to the displayed choice information.

While the method of inputting the reaction information is not limited particularly, it is preferable to input the information through an operation device, usually provided on general personal computers, such as a keyboard or mouse. Moreover, in case a voice input system (not shown) can be used, a microphone can also become an input operation device.

Examples of contents and input method of the comprehension degree information and the choice answer information are described in reference to the display screen 110 of the LCD 64 of the student terminal 6 shown in FIG. 17.

A comprehension degree information input area 113 is defined in the lower part of the graphic display area 111 of the display screen 110. In the comprehension degree information input area 113, a plural number of choices, in the form of buttons, are displayed corresponding to the comprehension degrees. In this example is displayed a button 113a ("I see") corresponding to a choice indicating comprehension, and a button 113b ("???") indicating incomprehension. A student can input comprehension degree information by clicking (choosing) one of the buttons displayed in the comprehension degree information input area 113 that matches his or her own comprehension degree.

On the other hand, in case choice questions are displayed, or a plural pieces of choice information 107, 107, . . . are displayed on the display screen 111, a student may click (choose) a piece of choice information 107 to be his or her own answer. Information corresponding to the choice information 107 chosen as described above is the choice answer information.

When the reaction information is inputted at the student terminal 6 as described above, the CPU 62 of the student terminal 6, as shown in FIG. 7, transmits the inputted reaction information through the communication interface 72 and also displays the whole or part of the information on his or her own student terminal 6 (steps S14 and S15).

The step S14 in FIG. 7 corresponds to the reaction information transmission means 36 in FIG. 3. The step S15 will be described later.

As shown in FIG. 7, the reaction information transmitted from the student terminal 6 is received with the teacher terminal 4 through the Internet 8. In other words, the CPU 42 of the teacher terminal 4 is monitoring whether or not reaction information is inputted, and in case the reaction information is not received, returns the control to the step S1. On the other hand, in case the reaction information is received, information corresponding to that is displayed on the teacher terminal 4 (steps S4 and S5).

While displayed contents and displaying method of the information corresponding to the received reaction information are not limited particularly, for example a user icon, reaction character string, reaction graph and reaction record are displayed on the display screen 100 of the LCD 44 of a teacher terminal 4. The user icon, reaction character string, reaction graph, and reaction record are delineated below.

In a user icon collective display area 102 defined in the lower part of the graphic display area 101 of the display screen 100 of the teacher terminal 4 shown in FIG. 18, are provided a plural number of user icon display areas as lined up in proper formation corresponding one to one to the respective student terminals 6. User icons 102a, 102b, 102c, . . . are displayed respectively in the user icon display areas. It is adapted that the color of the user icon corresponding to the student terminal 6, or to the transmission origin of the reaction information, varies according to the contents of the reaction information. Therefore, it is easy to grasp the comprehension degree of each student for the evaluated object information and the contents of answer of each student for the choice problem.

In this example, the students corresponding to the user icons 102a, 102b, and 102c respectively exhibit reactions corresponding to "???," "I see," and "I see," while other students exhibit no reactions at all.

In the graphic display area 101 of the display screen 100, character strings corresponding to the pieces of reaction information (for example the comprehension degree information, "I see" and "???") from the student terminals 6 are displayed as reaction character strings 108, 108, . . . . As a matter of course, reaction information other than the comprehension degree information, for example character strings corresponding to the items of the choice answer information, may be displayed as reaction character strings.

This example is also adapted that reaction character strings of predetermined colors corresponding to the contents of the reaction information are displayed randomly in undefined positions in the graphic display area 101 for only a predetermined period of time. This example is also adapted that the reaction character strings 108 and the user icons 102*a*, . . . are displayed simultaneously. Therefore, it is easy to see which student showed what contents of reaction even if an observer does not know the meanings of the colors of the user icons 102*a*, . . . .

Further, reaction graph columns 109 showing the number of times of receiving reaction information from the student terminal 6 are displayed in the graphic display area 101 of the display screen 100. This example is adapted to display reaction graph columns 109*a*, 109*b* in different colors for the items of reaction information, and at the same time, a sum of these with a reaction graph column 109*c*. In this way, total number of reactions can be seen. Like the case of the reaction character string, reaction information other than the comprehension degree information, for example a graph column corresponding to an item of the choice answer information may be displayed as a reaction graph column.

This example is also adapted that the height of the reaction graph column 190*a*, . . . corresponding to the number of times of receiving the reaction information is renewed every time the number increases, and the graph column 190*a*, . . . is deleted (by gradually reducing the height) when there is no same reaction information item within a predetermined period of time. Therefore, it is possible to grasp current occurrence frequency of every piece of reaction information while taking into consideration of accumulated number of times within a certain period of time.

On the left side of the graphic display area 101 of the display screen 100 shown in FIG. 15, a reaction record listing area 103 is defined to list the reaction information from the student terminals 6 in time sequence. In this embodiment, the list is made so that the contents of reaction information correspond to respective students, the transmitting persons. Therefore, it is easy to grasp what type of reaction comes frequently from which user in which time zone.

FIG. 8 shows details of step S5 of the process in which the user icons, reaction character strings, reaction graph columns, and reaction records are listed. In other words, in the step S5, the CPU 42 of the teacher terminal 4 executes the process steps of user icon display, reaction character string display, reaction graph display, and reaction record display (steps S31, S32, S33, and S34).

First, the user icon display step (step S31) is described. As described above, the user icons 102*a*, 102*b*, 102*c*, . . . shown in FIG. 18 correspond to the student terminals 6, 6, 6, . . . , each provided with a user ID (identity symbol). Further, a user ID as a transmission origin ID is attached to received reaction information, so that it is possible to discriminate where the reaction information has come from, upon seeing the reaction information (See FIG. 13).

Moreover, the user icons 102*a*, 102*b*, 102*c*, . . . are respectively time-wise controlled with individual countdown timers (not shown), each provided with a countdown timer ID (identity symbol).

Therefore, it results in that the user icons 102*a*, 102*b*, 102*c*, . . . respectively correspond to individual user ID's and countdown timer ID's.

This user icon display step is adapted to execute the display process for each of the user icons 102*a*, 102*b*, 102*c*, . . . . The user ID and the countdown timer ID that correspond to the user icon to be the subject of the display process are respectively called as the noted user ID and the noted countdown timer ID.

Detailed contents of the user icon display step, the step S31, are described in reference to FIG. 9. First, the CPU 42 of the teacher terminal 4 executes an initializing step (step S41).

In the initializing step, specific initial values are set for the noted user ID and the noted countdown timer ID.

Next, the CPU 42 determines whether or not the transmission origin ID of the received reaction information corresponds with the noted user ID. In case of correspondence, a color corresponding to the reaction information is given to a user icon corresponding to the noted user ID. At the same time, a countdown timer indicated with the noted countdown timer ID is reset, and the control goes to step S32 (steps S42 to S44).

The countdown timer is a timer that counts down. When the value of the timer becomes "0," it stops counting. When reset, it resumes countdown from a specified time point. When the value of the countdown timer becomes "0" in the user icon display process, a specified indication (for example yellow flashing) is made at a corresponding user icon. In effect, this timer functions as a timer for discriminating student terminals (or no-reaction students) that give no reaction information during the preset period of time.

While the above preset period of time is not limited particularly, it is set to an appropriate period of time for example 1 to 5 minutes. Also it is possible to permit the teacher to set freely at the teacher terminal 4 according to the contents of the evaluated object information.

In case the transmission origin ID of the received reaction information does not correspond with the noted user ID in the step S42 above, the CPU 42 determines if all the user ID's have been checked up in the step S42. In case all the user ID's have not been checked, next noted user ID and noted countdown timer ID are set, and the control is returned to the step S42 (steps S45 and S46).

In case it is determined in the step S45 that the checkup has been completed for all the user ID's, the control moves on directly to the step S32.

Next, the reaction character string display step (step S32) is described. In this step, the reaction character strings 108 corresponding to the reaction contents or the contents of the received reaction information (such as "I see," and "???" in FIG. 13) are displayed. The process is time-wise controlled for respective reaction character strings with individual countdown timers (not shown). Each countdown timer is provided with a countdown timer ID.

Therefore, it results in that reaction character strings corresponding to respective reaction contents are related to individual countdown timer ID's. It is adapted that display process is made for the respective reaction character strings in the reaction character display process. The reaction contents corresponding to the reaction character string to be the subject of the display process is called the noted reaction contents. The countdown timer ID corresponding to the reaction character string to be the subject of the display process is called the noted countdown timer ID.

The reaction character string display step, the step S32, is described in detail in reference to FIG. 10. The CPU 42 of the teacher terminal 4 executes first an initializing step (step S51). In the initializing step, initial values are specified and set for the noted reaction contents and the noted countdown timer ID.

Next, the CPU 42 determines whether or not the contents of the received reaction information correspond with the noted reaction contents. In case of correspondence, a reaction character string 108 corresponding to the noted reaction contents is displayed on the graphic display area 101 of the display screen 100 of the teacher terminal 4. At the same time, the countdown timer indicated with the noted countdown timer ID is reset, and the control goes to the step S33 (steps S52 to S54).

In the reaction character string display step, the corresponding reaction character string 108 remains displayed until the value of the countdown timer becomes "0." When it becomes "0," the display is put out. While the time set with this countdown timer is not limited particularly, it is set for example to about 3 seconds. In other words, the reaction character string 108 remains displayed for only a predetermined period of time.

In case the contents of the received reaction information do not correspond with the noted reaction contents in the above step S52, the CPU determines if the checkup in the step S52 has been made for all the reaction contents. If not completed, the CPU 42 sets the next noted reaction contents and noted countdown timer ID, and moves the control to the step S52 (steps S55 and S56).

In case it is determined in the step S55 that all the reaction contents have been checked up, the control goes directly to the step S33.

Next, the reaction graph display process (step S33) is described. This process is controlled to display the graph columns after changing the heights of the reaction graph columns 109a, 109b, and 109c representing the received reaction contents (such as "I see," "???," "I see," or "???") to the heights corresponding to the number of times of receiving the reaction contents. Each of the graph columns is time-wise controlled with an individual countdown timer (not shown), provided with a countdown timer ID.

Therefore, reaction graph columns corresponding to respective reaction contents are made to correspond to the individual countdown timer ID's. The reaction graph display process is made to execute the display process for each reaction graph column. The reaction content corresponding to the reaction graph column to be the subject of the display process is called the noted reaction content, and the countdown timer ID corresponding to the reaction graph column to be the subject of the display process is called the noted countdown timer ID.

The reaction graph display step, the step S33, is described in detail in reference to FIG. 11. First, the CPU 42 of the teacher terminal 4 executes the initializing step (step S61). In the initializing step, specific initial values are set to the noted reaction content and noted countdown timer ID.

Next, the CPU 42 determines whether or not the received reaction information content corresponds with the noted reaction content. In case of correspondence, the reaction graph column corresponding to the noted reaction content is renewed and displayed on the graphic display area 101 of the display screen 100 of the teacher terminal 4. At the same time, the countdown timer indicated with the noted countdown timer ID is reset, and the control moves to the step S34 (steps S62 to S64).

In the reaction graph display process, a renewed reaction graph column is displayed until the countdown timer value becomes "0." When the value comes to "0," the display is put out (the height of the reaction graph column is lowered gradually). While the period of time set for this countdown timer is not limited particularly, it is set for example to about 3 seconds. In other words, the renewed reaction graph is displayed for only the preset period of time and then put out (the height of the reaction graph column is gradually lowered).

In case the received reaction information content does not correspond with the noted reaction content in the above step S62, the CPU 42 determines if all the reaction contents have been checked in the step S62. If not, the CPU 42 sets the next noted reaction content and noted countdown timer ID and returns the control to the step S62 (steps S65 and S66).

In case the step S65 determines that all the reaction contents have been checked up, the control goes directly to the step S34.

Next, the reaction record display step (step S34) shown in FIG. 8 is described. In this step, the CPU 42 lists records (character strings) of the received reaction information contents or reaction contents (such as "I see," and "???" in FIG. 13) made to correspond to the transmission origin ID's and displays the list on the reaction record area 103 of the display screen 100 of the teacher terminal 4 (See FIG. 15).

The step S5 in FIG. 7 corresponds to the reaction information display means 13 of FIG. 2. The steps S31 to S34 respectively correspond to the user icon display means 13a, reaction character string display means 13b, reaction graph display means 13c, and reaction record display means 13d.

Referring to FIG. 7 again, when the reaction information display step, the step S5, is over as described above, the CPU 42 of the teacher terminal 4 returns the control to the step S1 to repeat the steps S1 to S5. Incidentally, the kind of reaction information corresponding to the information to be shown at the teacher terminal 4 may be chosen appropriately.

On the other hand, the CPU 62 of the student terminal 6 is monitoring the reaction information from other student terminals 6 (information from other users). In case the CPU 62 receives no information from other users, the control returns to the step S11. In case the CPU 62 receives information from other users, information corresponding to the received reaction information is displayed (steps S16 and S17).

The above-described process in the steps S15 and S17 (reaction information display process) is the same as the reaction information display process in the step S5, except the place for displaying the information corresponding to the reaction information is the display screen 110 of the student terminal 6. Also the display screen 110 of the student terminal 6 is the same in constitution as the display screen 100 of the teacher terminal 4 concerning the display of information corresponding to the reaction information. Incidentally, the kind of reaction information corresponding to the information to be displayed on the student terminal 6 may be chosen appropriately. FIG. 17 showing the display screen 100 of the student terminal 6 is an example in which nothing corresponding to the reaction information is displayed at all on the student terminal 6.

The step S16 of FIG. 7 corresponds to the other user information acquisition means 37, and the steps S15 and S17 correspond to the reaction information display means 33.

The evaluated object information transmitted from the teacher terminal 4 in the step S2 of FIG. 7 and the reaction information transmitted from the student terminal 6 in the step S14 are also received respectively through the Internet 8 with the data control server 10. In other words, the data control server 10 is monitoring the information (communication information) transmitted between the teacher terminal 4 and the student terminals 6, 6, . . . . The data control server 10, upon receiving the communication information, stores it in the communication information database 80 (steps S21 and S22).

While the information stored in the communication information database 80 is not limited particularly, for example the on-blackboard information and various control instruction information constituting the evaluated object information, and the reaction information to the evaluated object information are stored. The control instruction information includes for example: choice display instruction information for causing to display the choice information on the display screen, blackboard erasure instruction information for erasing the on-blackboard information from the display screen, and display instruction information and erasure instruction information for images and pictures.

As shown in FIG. 13, in this embodiment, these information contents are made to correspond to the kinds of information and stored in the order of reception time. Incidentally, The reception time is the internal time of the data control server 10 clocked at 1/60 second intervals.

Contents of the on-blackboard information are for example: pen point shape information, color option information, and stroke information. The pen point shape information is to specify the pen point shape used for writing on the blackboard. The color option information includes information on the ink used, and color information. The information on the ink used is for example information for specifying the degree of transparency of ink. The color information is the information for specifying the color of ink. The stroke information is made up of many coordinate values indicating the pen point loci in the graphic display area 101. The pen point loci; or the characters, figures, symbols, etc. written on the blackboard in the graphic display area 101 are expressed as lines tracing, in the order of being written, many coordinate values written as the stroke information.

Information items of the choice display instruction include for example: transmission origin ID, transmission address ID, choice number information, and choice content information. The transmission origin ID and the transmission address ID are respectively information items for specifying transmission origin and transmission address of the choice information. In case choice information is transmitted from the teacher terminal 4 to all the student terminals 6, 6, . . . , the transmission origin ID and the transmission address ID may be omitted. In case the choice information is transmitted to specific students, the transmission origin ID and the transmission address ID are written. The choice number information is the information for specifying the choice number. The choice content information is the information for specifying contents (character strings) to be displayed as choices.

Contents of the reaction information include for example the transmission origin ID and the reaction content information. The transmission origin ID is the information for specifying the transmission origin. The reaction content information represents details of the reaction, including for example: information on the degree of comprehension of the evaluated object information transmitted from the teacher terminal 4, and information on the reply to the choice information transmitted from the teacher terminal 4.

As will be described later, it is possible to reproduce the whole or part of the evaluated object information and the information corresponding to the reaction information at the teacher terminal 4 or student terminal 6 on the basis of respective pieces of information stored in the communication information database 80.

The constitution of the communication information database is not limited to the above. For example, it is possible to classify the communication information into a plural number of groups and store each group in a dedicated table in the order of reception time. In that case, the classification maybe made for example into: on-blackboard information group, control instruction information group, and reaction information group.

Next, the communication information reproduction process is described. The communication information reproduction process is normally executed at an appropriate time after a lecture is over. In reference to FIG. 12, the communication information reproduction process executed at the teacher terminal 4 is described.

The CPU 42 of the teacher terminal 4, when a communication information reproduction process instruction is entered through an input device such as a keyboard 46 and a mouse 48 at the teacher terminal 4, demands the data control server 10 to transmit evaluated object information specified by the instruction (step S71).

The above communication information reproduction process instruction includes a evaluated object information demand signal and a reaction information demand signal. The evaluated object information demand signal is a signal for specifying evaluated object information demanded to be transmitted. The reaction information demand signal is a signal for specifying reaction information demanded to be transmitted.

The data constitution of the evaluated object information demand signal is shown in FIG. 14A. The evaluated object information demand signal includes: a transmission time field indicating the time at which the communication information reproduction process instruction including the demand signal was transmitted, a demand information type field indicating the type of information demanded to be transmitted, and a demand information contents filed for exactly specifying the information item demanded to be transmitted.

The transmission time is the internal time of the teacher terminal 4, clocked at 1/60 second intervals. The demand information type is for example graphic. The demand information contents are for example: start time, time interval, and the number of pages of evaluated object information demanded to be transmitted. The start time is expressed for example in 1/60 second unit assuming the lecture start to be "0." The time interval is the sampling period for the evaluated object information demanded to be transmitted, expressed for example in 1/60 second unit. The number of pages is the total number of evaluated object information samples demanded to be transmitted.

Therefore, it is seen that the evaluated object information demand signal shown in FIG. 14A as an example is a signal demanding graphic information to be transmitted in a total of 7 pages at 1 minute intervals from the start of the lecture.

The data constitution of the reaction information demand signal is shown in FIG. 14B. Also the reaction information demand signal, like the evaluated object information demand signal, includes a transmission time field, a demand information type field, and a demand information content field. However, it is different from the evaluated object information demand signal in that the demand information contents field includes a field for specifying a subject user ID. Specifying a subject user ID makes it possible to demand the data control server 10 to transmit only reaction information from the student terminal 6 corresponding to the specified user ID. In other words, it is possible to reproduce the situation of the lecture while taking note of reaction of a specific student or students.

The reaction information demand signal shown as an example in FIG. 14B is the signal that demands reaction information on all the students to be transmitted in a total of 7 pages at 1 minute intervals from the start of the lecture.

Referring again to FIG. 12, in the step S71, the evaluated object information demand signal (in FIG. 14A) is transmitted to the data control server 10.

The CPU 22 of the data control server 10, upon receiving the evaluated object information demand signal through the Internet 8, extracts the evaluated object information, specified with the signal, from the communication information database 80, and transmit the extracted evaluated object information to the teacher terminal 4 through the Internet 8 (step S81).

The CPU 42 of the teacher terminal 4 receives the evaluated object information transmitted from the data control server 10 (graphic information in this case) and displays information corresponding to the received information on the display screen 100 of the teacher terminal 4 (step S72).

On the display screen 100 shown in FIG. 19 are defined two communication information reproduction areas 121 and 122. As a matter of course, the number of the communication information reproduction areas is not limited; it may be one, or more than two. This example is adapted to display information corresponding to the reaction information for all the students on the communication information reproduction area 121, and to display information corresponding to the reaction information for a specific student or students on the communication information reproduction area 122.

The evaluated object information acquired in the step S72 is displayed in time sequence on the evaluated object information reproduction area 121a of the communication information reproduction area 121. In this embodiment, a total of 7 pages of graphic information 123, 123, . . . sampled at one minute intervals from the start of the lecture are displayed in time sequence from left to right.

As shown in FIG. 12, the CPU 42 of the teacher terminal 4 then demands the data control server 10 to transmit the reaction information specified with the reaction information demand signal contained in the communication information reproduction process instruction (steps S73 to S75). In other words, the data control server 10 is demanded to transmit reaction information on all the users in case all the user ID's are specified as subjects with the reaction information demand signal, or to transmit reaction information on a specific student in case a specific user's ID is specified.

In specific terms, the reaction information as shown in FIG. 14B is to be transmitted to the data control server 10.

The CPU 22 of the data control server 10, upon receiving the reaction information demand signal through the Internet 8, extracts the reaction information specified with the demand signal from the communication information database 80, and transmits the extracted reaction information through the Internet 8 to the teacher terminal 4 (step S82).

The CPU 42 of the teacher terminal 4 receives the reaction information transmitted from the data control server 10, and displays information corresponding to that information on the display screen 100 of the teacher terminal 4 (step S76).

As the information corresponding to the reaction information acquired in the step S76, there are for example a reaction information transition graph 124 and reaction record transition information 125 shown in FIG. 19.

The reaction information transition graph 124 shows transition with time of the reaction information from students specified with subject user ID's. In this embodiment, reaction information is shown in graphs by the reaction item. In other words, the number of pieces of reaction information from the subject students are summed up for every reaction item in every sampling period, and the transition of respective sums is shown in graphs.

The reaction information transition graph 124 in the communication information reproduction area 121 of the example in FIG. 19 shows with three curves the transition of sums of reaction items for all the students (for example, three types of comprehension degree: "I see," "???," "I see" or "???") in every sampling period (one minute) from the start of the lecture. In this example, the reaction information transition graph 124 is displayed as superposed on the evaluated object information in the evaluated object information reproduction area 121a. Of course, the place for displaying the reaction information transition graph 124 is not limited to this.

Next, the reaction record transition information 125 is a time-sequential list of reaction information (vertically displayed in this case) from students specified with the subject user ID' s within a specific period of time (one sampling period) A plural pieces of reaction record transition information 125 produced at every period are further displayed in time sequence to constitute a reaction record reproduction area 121b. This embodiment is adapted to display the reaction record transition information 125 with the reaction information contents made to correspond to the students or transmitting persons.

In the reaction record reproduction area 121b of the communication information reproduction area 121 in the example of FIG. 19, reaction record transition information 125 is displayed in time sequence (from left to right in this case) for all the students at every sampling period (one minute) from the start of the lecture.

As shown in FIG. 19, the communication information reproduction area 121 is adapted to display: the graphic information 123 or the evaluated object information, the reaction information transition graph 124 showing the reaction to the evaluated object information, and the reaction record transition information 125, for every sampling period, adjacent to each other (one over another in this case). Therefore, it is possible to analyze later the lecture in time sequence.

Further as shown in FIG. 19, a reception time display area 121c for displaying both the time of receiving the evaluated object information and the reaction information (in this case equivalent to the time elapsed from the start of the lecture) is provided between the evaluated object information reproduction area 121a and the reaction record reproduction area 121b of the communication information reproduction area 121.

The communication information reproduction area 122 shown in FIG. 19 is different from the communication information reproduction area 121 in that the former is for all the students as subjects. The evaluated object information reproduction area 122a, reaction record reproduction area 122b, and reception time display area 122c of the communication information reproduction area 122 respectively correspond to the evaluated object information reproduction area 121a, reaction record reproduction area 121b, and reception time display area 121c of the communication information reproduction area 121.

Parallel display of the communication information reproduction area 121 for all the students and the communication information reproduction area 122 for specific students in the single display screen 100 as described above conveniently permits easy observation of the difference between the two. Of course it is possible to display a plural number of communication information reproduction areas for a plural number of students in the single display screen 100.

The steps S71 to S76 in FIG. 12 correspond to the communication information reproduction means 14 in FIG. 2.

While this embodiment is described as an example case in which the communication information reproduction process is executed at the teacher terminal 4, the process may also be executed at the student terminal(s) 6. The communication information reproduction process at the student terminal 6 is the same as that executed in the above steps S71 to S76 except that the place of displaying the information corresponding to the communication information acquired from the data control server 10 is the display screen 110 of the student terminal 6. The process of the data control server 10 corresponding to the above is also the same as that in the above steps S81 and S82. Also the display screen 110 of the student terminal 6 is the same in constitution as the display screen 100 of the teacher terminal 4 concerning the display of information corresponding to communication information.

In case the communication information reproduction process is executed at the student terminal 6, the process for specific student may restrict its subject to oneself.

The communication information reproduction process at the student terminal 6, similar to that in the steps S71 to S76 in FIG. 12, corresponds to the communication information reproduction means 34 in FIG. 3.

While the above embodiment is described as an example case in which the invention is applied to remote teaching provided through the communication network on the assumption that the provider side terminal is the teacher terminal and the user terminal is the student terminal, the invention is not limited to this. While it may be applied as a matter of course to lectures given through the information communication network, it may be applied to any systems required to provide evaluated object information through an information communication network and to accurately grasp reactions to the evaluated object information without using special equipment, for example to presentations, conferences, auctions, etc.

In the embodiment described above, the user side terminal devices are assumed to be personal computers. However, the user side terminal devices are not limited to personal computers. For example, portable phones and portable information terminals may be used as the user side terminal devices.

Further, block diagrams, hardware constitution, flowcharts, data constitution, specific data of various types, mentioned above are explained as examples. The invention is not limited to such specific examples.

Further, types and number of databases are not restricted particularly. The above-described database may be divided into a plural number of databases.

The above embodiment is described as an example in which the provider side terminal device and the communication information memory device are interconnected through the information communication network. However, the invention is not limited to the above. For example, the provider side terminal device and the communication information memory device may be interconnected directly, or a single device serving both as the provider side terminal device and as the communication information memory device may be used. Also it is possible to distribute a plural number of computers in different places to constitute a communication information memory device. In case of such distribution, they can be interconnected through an information communication network.

While the above embodiment as an example is described with a single provider side terminal device, it is possible to use a plural number of provider side terminal devices. In that case, it is possible to make the provider side terminal devices mutually communicable, or make the user side terminal devices and the provider side terminal devices mutually communicable, through a communication network.

While the above embodiment is described with the Internet as an example of information communication network, the information communication network is not limited to the Internet. The invention may also be embodied using a network such as a LAN (local area network), WAN (wide area network), or intranet to interconnect a plural number of computers.

This embodiment is adapted that the program executed on the provider side terminal device is the one installed on the provider side terminal device. However, the manner of storing the program for the provider terminal device side is not limited to the above; the program may be stored for example on a CD-ROM, flexible disk, magnetic tape, etc.

Further it is possible to distribute the program for the provider terminal device side through wired or wireless communication network. Further it is possible to store the program for the provider terminal device side in a program server (not shown) and cause a local computer to execute the program through an information communication network such as the Internet.

The above embodiment is also adapted to load the program for the user terminal device side before being executed every time from the program distribution server through the information communication network onto the main memory of the user side terminal device, and erase the program when its execution is over. However, the manner of distributing the program on the user terminal device side is not limited to the above.

For example, it is possible to download first the program on the user terminal device side from the program distribution server through the information communication network onto an external memory device such as a hard disk, load it from the external memory device onto the main memory, and execute it. In this way, from the next time on, the program may be executed without gaining access to the program distribution server.

It is also possible to distribute the program for the user terminal device side using a recording medium such as a CD-ROM, flexible disk, magnetic tape, etc.

Also the manner of recording and distributing programs and data are not limited particularly. In addition to recording on recording media and distributing them for direct execution, it is also possible for example to record it on a recording medium in compressed form and distribute it to be extracted and used.

While the above embodiment is described as an example of realizing the functions of FIGS. 2 and 3 using a computer, it is also possible to constitute part of the functions using a hardware logic.

The reaction information display system according to this invention comprises: a provider side terminal device having a provider side display device, and a plural number of user side terminal devices each having a user side input operation device and a user side display device, and capable of communicating through an information communication network with the provider side terminal, characterized in that the provider side terminal device has a evaluated object information transmission means for transmitting evaluated object information, the user side terminal device has a evaluated object information display means for receiving and displaying the evaluated object information transmitted from the provider side terminal device through the information communication network on the user side display device and a reaction information transmission means for transmitting reaction information made to correspond to the user side terminal device when the user side input operation device is operated in reaction to the displayed evaluated object information, and the provider side terminal device further has a reaction information display means for receiving reaction information transmitted from the user side terminal device through the information communication network and for displaying information corresponding to the received reaction information on the provider side display device.

The provider side terminal device according to this invention is the provider side terminal device used in a system comprising: the provider side terminal device having a provider side display device, and a plural number of user side terminal devices each having a user side input operation device and a user side display device, and capable of communicating through an information communication network with the provider side terminal, characterized by comprising: a evaluated object information transmission means for transmitting evaluated object information, and a reaction information display means for receiving through the information communication network the reaction information, made to correspond to the user side terminal device, transmitted as a result of the user side input operation device being operated in reaction to the evaluated object information transmitted with the evaluated object information transmission means and received through the information communication network with the user side terminal device and displayed on the user side display device, and for displaying information corresponding to the received reaction information on the provider side display device.

The user side terminal device according to this invention is the user side terminal device used in a system comprising: a provider side terminal device having a provider side display device, and a plural number of user side terminal devices each having a user side input operation device and a user side display device, and capable of communicating through an information communication network with the provider side terminal, characterized by comprising: a evaluated object information display means for receiving and displaying the evaluated object information transmitted from the provider side terminal device through the information communication network on the user side display device, and a reaction information transmission means for transmitting reaction information when the user side input operation device is operated in reaction to the displayed evaluated object information, so that information, corresponding to the reaction information made to correspond to the user side terminal device and transmitted through the information communication network to the provider side terminal device, is displayed on the provider side display device.

The computer program and the recording medium recording the computer program according to the invention are characterized by causing a provider side terminal device used in a system comprising: a provider side terminal device having a provider side display device, and a plural number of user side terminal devices each having a user side input operation device and a user side display device, and capable of communicating through an information communication network with the provider side terminal, to function as: a evaluated object information transmission means for transmitting evaluated object information, and a reaction information display means for receiving through the information communication network the reaction information, made to correspond to the user side terminal device, transmitted as a result of the user side input operation device being operated in reaction to the evaluated object information transmitted with the evaluated object information transmission means and received through the information communication network with the user side terminal device and displayed on the user side display device, and for displaying information corresponding to the received reaction information on the provider side display device.

The computer program and the recording medium recording the computer program according to the invention are characterized by causing a user side terminal device used in a system comprising: a provider side terminal device having a provider side display device, and a plural number of user side terminal devices each having a user side input operation device and a user side display device, and capable of communicating through an information communication network with the provider side terminal, to function as: a evaluated object information display means for receiving evaluated object information transmitted from the provider side terminal device through the information communication network and displaying the received information on the user side display device, and a reaction information transmission means for transmitting reaction information when the user side input operation device is operated in reaction to the displayed evaluated object information, so that information, corresponding to the reaction information made to correspond to the user side terminal device and transmitted through the information communication network to the provider side terminal device, is displayed on the provider side display device.

In other words, the reaction information display system, the provider side terminal device, the user side terminal devices, the computer program, and the recording medium recording the computer program according to the invention are constituted as follows: The provider side terminal device is communicable with a plural number of user side terminal devices through the information communication network. The provider side terminal device transmits evaluated object information. The user side terminal device receives the transmitted evaluated object information through the information communication network and displays the received information on the user side display device. When the user side input operation device is operated in reaction to the displayed evaluated object information, the user side terminal device transmits reaction information made to correspond to the user side terminal device. The provider side terminal device receives the transmitted reaction information through the information communication network and displays information corresponding to the received reaction information on the provider side display device.

Therefore, the user (for example a student) can see the evaluated object information (for example contents of a lecture), transmitted from the information provider (for example a teacher) and displayed on the user side display device (for example an LCD), and can transmit reaction to the displayed information (for example "I see") to the information provider by operating the user side input device (for example a keyboard or mouse). The information provider can immediately find out how the student reacted to the transmitted evaluated object information upon seeing the information, corresponding to the reaction information, displayed on the provider side display device (for example an LCD).

In other words, the constitution, though simple without using special equipment, makes it possible to easily grasp the reaction of many users to a single evaluated object information presented through the information communication network in real time. Therefore, it is possible for each user to share the same feeling as if all the users were present in the same place facing the information provider to watch and listen to the evaluated object information.

With the reaction information display system, the provider side terminal device, the computer program, and the recording medium recording the computer program according to the invention, the reaction information display means is characterized by comprising a user icon display means that controls to define a user icons collective display area, in which a plural number of user icon display areas made to correspond to respective user side terminal devices are put in order, in part of the provider side display device, and controls so that information corresponding to the reaction information from respective user side terminal devices is displayed with icons in corresponding user icon display areas.

In other words, a plural number of icons corresponding to the respective users may be collectively displayed on the provider side terminal device. Reactions from the respective users, in the form of icons corresponding to the reactions, are displayed on the corresponding user icon display areas.

Therefore, the information provider, upon seeing the user icons collective display area defined on the provider side display device, can grasp at a glance which user has shown what reaction to the evaluated object information transmitted.

The reaction information display system and the provider side terminal device according to the invention are characterized as follows: The system further comprises the communication information memory device having a communication information database storing communication contents, communicated between respective terminal devices constituting the system, in relation to communication times and information types. The provider side terminal device further comprises a communication information reproduction means that acquires the whole or part of the information communicated between respective terminal devices and stored in the communication information database while specifying communication time and information type and reproduce information corresponding to the acquired information on the provider side display device.

The computer program and the recording medium recording the computer program according to the invention is characterized as follows: The system further comprises the communication information memory device having a communication information database storing communication contents, communicated between respective terminal devices constituting the system, in relation to communication times and information types. The computer program further causes the provider side terminal device to function as a communication information reproduction means that acquires the whole or part of the information communicated between respective terminal devices and stored in the communication information database while specifying communication time and information type and reproduces information corresponding to the acquired information on the provider side display device.

In other words, with the reaction information display system, the provider side terminal device, the computer program, and the recording medium recording the computer program according to the invention, the information contents communicated between the respective terminal devices are related to communication time and type of information and stored in the communication information database. The information provider can acquire the whole or part of the information stored in the communication information database while specifying communication time and type of information, and reproduce and display information corresponding to the acquired information on the provider side display device.

Therefore, the information provider, upon seeing the information reproduced on the provider side display device, can confirm at a later time what reaction at what time point the user showed to the transmitted evaluated object information.

The user side terminal device according to the invention is further characterized in that it is communicable with other user side terminals through the information communication network and that it further comprises: an other user information acquisition means for receiving information transmitted from other user side terminal devices through the information communication network, and a reaction information display means for displaying on the user side display means information corresponding to the reaction information from the respective user side terminal devices.

With the computer program and the recording medium recording the computer program, the user side terminal device is characterized by being communicable with other user side terminal devices through the information communication network. The computer program is further characterized to cause the user side terminal device to function as an other user information acquisition means for receiving through the information communication network reaction information transmitted from other user side terminal devices and as a reaction information display means for displaying information corresponding to the reaction information from the respective user side terminal devices on the user side display device.

In other words, with the user side terminal device, the computer program and the recording medium recording the computer program, the user side terminal device can communicate also with other user side terminal devices through the information communication network, and can receive reaction information transmitted from other user side terminal devices to display information corresponding to the reaction information from respective other user side terminal devices on the user side display device.

Therefore, the user can immediately find out what reaction other users showed to the evaluated object information transmitted from the information provider. Therefore, it is possible for each user to share the same feeling as if all the users were present in the same place facing the information provider to watch and listen to the evaluated object information.

With the user side terminal device, the computer program, and the recording medium recording the computer program, the reaction information display means is characterized by comprising a user icon display means that controls to define a user icons collective display area, in which a plural number of user icon display areas made to correspond to respective user side terminal devices are put in order, in part of the user side display device, and to display information corresponding to the reaction information from respective user side terminal devices using icons in corresponding user icon display areas.

In other words, it is possible to display collectively a plural number of icons corresponding to respective users including other users on the user side display device. Reaction from each user is displayed as an icon corresponding to the reaction in a corresponding icon display area.

Therefore, each user, upon seeing the user icons collective display area defined on the user side display device, can grasp at a glance what user showed what reaction to the evaluated object information received.

With the user side terminal devices according to the invention, it is characterized that the system further comprises a communication information memory device having a communication information database for storing information contents, related to communication time and type of information, communicated between terminal devices constituting the system, and the user side terminal device is capable of communicating with also the communication information memory device through the information communication network, and the user side terminal device comprises a communication information reproduction means for acquiring, while specifying communication time and type of information, the whole or part of information communicated between respective terminal devices and stored in the communication information database and reproducing information corresponding to the acquired information on the user side display device.

With the computer program and the recording medium recording the computer program according to the invention, it is characterized in that the system further comprises a communication information memory device having a communication information database storing information contents communicated between terminal devices constituting the system in relation to communication time and type of information, the user side terminal devices are communicable with the communication information memory device through the information communication network, and the computer program further causes the user side terminals as communication information reproduction means for acquiring, while specifying communication time and type of information, the whole or part of information communicated between the terminal devices and stored in the communication information database and reproducing and displaying on the user side display devices information corresponding to the acquired information.

In other words, with the user side terminal devices, the computer program, and the recording medium recording the computer program according to the invention, contents of information, communicated between the terminal devices in relation to communication time and type of information are stored in the communication information database, and the users can acquire, while specifying communication time and type of information, the whole or part of information stored in the communication information database, and reproduce and display information corresponding to the acquired information on the user side terminal device.

Therefore, users can reconfirm the evaluated object information reproduced and displayed on the user side terminal devices. It is also possible for a user to confirm at a later time what reactions the user himself or herself or other users showed at what time point to the evaluated object information.

While the invention is described above as a preferable embodiment, the wording is used not for restriction but for explanation and therefore may be changed within the scope of appended claims without departing from scope and spirit of the invention.

The invention claimed is:

1. A reaction information display comprising:
   a provider side terminal device having a provider side display device; and a plural number of user side terminal devices, each having a user side input operation device and a user side display device, capable of communicating through an information communication network with the provider side terminal device, wherein
   the provider side terminal device has an evaluated object information transmission means for transmitting evaluated object information,
   each user side terminal device has an evaluated object information display means for receiving and displaying on the user side display device the evaluated object information transmitted from the provider side terminal device through the information communication network, and a reaction information transmission means for transmitting reaction information corresponding to the user side terminal device when the user side input operation device is operated in reaction to the displayed evaluated object information, and
   the provider side terminal device further has a reaction information display means for receiving reaction information transmitted from the user side terminal devices through the information communication network and for displaying information corresponding to the received reaction information on the provider side display device, wherein
   the reaction information display means has a user icon display means that defines, in part of the provider side display device, a user icons collective display area including a plural number of user icon display areas corresponding to the respective user side terminal devices and displays, using icons, information corresponding to the reaction information from the respective user side terminal devices in corresponding user icon display areas, and
   the user icon display means changes colors of the icons displayed in the user icon display areas based on the reaction information.

2. A reaction information display system comprising:
   a provider side terminal device having a provider side display device; and
   a plural number of user side terminal devices, each having a user side input operation device and a user side display device, capable of communicating through an information communication network with the provider side terminal device, wherein
   the provider side terminal device has an evaluated object information transmission means for transmitting evaluated object information,
   each user side terminal device has an evaluated object information display means for receiving and displaying on the user side display device the evaluated object information transmitted from the provider side terminal device through the information communication network, and a reaction information transmission means for transmitting reaction information corresponding to the user side terminal device when the user side input operation device is operated in reaction to the displayed evaluated object information, and
   the provider side terminal device further has a reaction information display means for receiving reaction information transmitted from the user side terminal devices through the information communication network and for displaying information corresponding to the received reaction information on the provider side display device, wherein
   the reaction information display system further has a communication information memory device having a communication information database for storing contents of information, communicated between the devices constituting the system, related to communication time and information type,
   the provider side terminal device further has a communication information reproduction means for acquiring, while specifying communication time and information type, the whole or part of the information communicated between the respective terminal devices and stored in the communication information database, and for reproducing and displaying information corresponding to the acquired information on the provider side display device, and
   the communication information reproduction means acquires graphic information sampled at certain intervals as the evaluated object information, acquires a reaction information transition graph showing a transition of sums in even sampling period of the number of pieces of the reaction information corresponding to the evaluated object information, and reproduces and displays the graphic information and the reaction information transition graph adjacent to each other on the provider side display device.

3. A provider side terminal device used in a system comprising:
   the provider side terminal device having a provider side display device, and
   a plural number of user side terminal devices, each having a user side input operation device and a user side display device, capable of communicating through an information communication network with the provider side terminal device, wherein the provider side terminal device has:
an evaluated object information transmission means for transmitting evaluated object information, and
a reaction information display means for receiving reaction information, corresponding to the user side terminal devices, transmitted as a result of the user side input operation devices being operated in reaction to the evaluated object information transmitted from the evaluated object information transmission means and received by the user side terminal devices through the information communication network and displayed on the user side display devices, and for displaying information corresponding to the received reaction information on the provider side display device, wherein
the reaction information display means has a user icon display means that defines, in part of the provider side display device, a user icons collective display area, including a plural number of user icon display areas corresponding to the respective user side terminal devices and displays using icons, information corresponding to the reaction information from the respective user side terminal devices in corresponding user icon display areas and
the user icon display means changes colors of the icons displayed in the user icon display areas based on the reaction information.

4. A provider side terminal device used in a system comprising:
the provider side terminal device having a provider side display device, and
a plural number of user side terminal devices, each having a user side input operation device and a user side display device, capable of communicating through an information communication network with the provider side terminal device, wherein the provider side terminal device has:
an evaluated object information transmission means for transmitting evaluated object information, and
a reaction information display means for receiving reaction information, corresponding to the user side terminal devices, transmitted as a result of the user side input operation devices being operated in reaction to the evaluated object information transmitted from the evaluated object information transmission means and received by the user side terminal devices through the information communication network and displayed on the user side display devices, and for displaying information corresponding to the received reaction information on the provider side display device, wherein
the system further has a communication information memory device having a communication information database for storing contents of information, communicated between the devices constituting the system, related to communication time and information type,
the provider side terminal device further has a communication information reproduction means for acquiring, while specifying communication time and information type, the whole or part of the information communicated between the respective terminal devices and stored in the communication information database, and for reproducing and displaying information corresponding to the acquired information on the provider side display device, and
the communication information reproduction means acquires graphic information sampled at certain intervals as the evaluated object information, acquires a reaction information transition graph showing a transition of sums in every sampling period of the number of pieces of the reaction information corresponding to the evaluated object information, and reproduces and displays the graphic information and the reaction information transition graph adjacent to each other on the provider side display device.

5. A user side terminal device used in a system having:
a provider side terminal device having a provider side display device, and
a plural number of user side terminal devices, each having a user side input operation device and a user side display device, capable of communicating through an information communication network with the provider side terminal device, wherein
each user side terminal device has:
an evaluated object information display means for receiving evaluated object information transmitted from the provider side terminal device through the information communication network and for displaying the received information on the user side display device, and
a reaction information transmission means for transmitting reaction information so that information, corresponding to the reaction information corresponding to the user side terminal device and transmitted to the provider side terminal device through the information communication network when the user side input operation device is operated in reaction to the displayed evaluated object information, is displayed on the provider side display device, wherein
each user side terminal device is capable of communicating with other user side terminal devices through the information communication network and further comprises:
an other user information acquisition means for receiving reaction information transmitted from other user side terminal devices through the information communication network, and
a reaction information display means for displaying information corresponding to the reaction information from other user side terminal devices on the user side display device, wherein
the reaction information display means has a user icon display means that defines, in part of the user side display device, a user icons collective display area including a plural number of user icon display areas corresponding to the respective user side terminal devices and displays, using icons, information corresponding to the reaction information from the respective user side terminal devices in corresponding user icon display areas, and
the user icon display means changes colors of the icons displayed in the user icon display areas based on the reaction information.

6. A user side terminal device used in a system having:
a provider side terminal device having a provider side display device, and
a plural number of user side terminal devices, each having a user side input operation device and a user side display device, capable of communicating through an information communication network with the provider side terminal device, wherein
each user side terminal device has:
an evaluated object information display means for receiving evaluated object information transmitted from the provider side terminal device through the information communication network and for displaying the received information on the user side display device, and a reaction information transmission means for transmitting reaction information so that information, corresponding to the reaction information corresponding to the user side terminal device and transmitted to the provider side terminal device through the information communication network when the user side input operation device is operated in reaction to the displayed evaluated object information, is displayed on the provider side display device, wherein the system further has a communication information memory device having a communication information database for storing information contents, related to communication time and information type, transmitted between terminal devices constituting the system, the user side terminal device is capable of communicating with also the communication information memory device through the information communication network, and further has a communication information reproduction means for acquiring, while specifying communication time and information type, the whole or part of the information transmitted between the terminal devices and stored in the communication information database, and for reproducing and displaying information corresponding to the acquired information on the user side display device, and the communication information reproduction means acquires graphic information sampled at certain intervals as the evaluated object information, acquires a reaction information transition graph showing a transition of sums in every sampling period of the number of pieces of the reaction information corresponding to the evaluated object information, and reproduces and displays the graphic information and the reaction information transition graph adjacent to each other on the user side display device.

7. A computer program embodied on a computer-readable medium that causes a provider side terminal device used in a system comprising the provider side terminal device having a provider side display device, and a plural number of user side terminal devices each having a user side input operation device and a user side display device, and capable of communicating through an information communication network with the provider side terminal, to function as:

an evaluated object information transmission means for transmitting evaluated object information, and a reaction information display means for receiving reaction information corresponding to the user side terminal devices, transmitted through the information communication network when the user side input operation device is operated in reaction to the evaluated object information transmitted from the evaluated object information transmission means and received with the user side terminal device through the information communication network and displayed on the user side display device, and for displaying information corresponding to the received reaction information on the provider side display device, wherein the reaction information display means has a user icon display means that defines, in part of the provider side display device, a user icons, collective display area including a plural number of user icon display areas corresponding to the respective user side terminal devices and displaying, using icons, information corresponding to the reaction information from the respective user side terminal devices in corresponding user icon display areas, and the user icon display means changes colors of the icons displayed in the user icon display areas based on the reaction information.

8. A recording medium recording thereon the computer program of claim 7.

9. A computer program embodied on a computer-readable medium that causes a provider side terminal device used in a system comprising the provider side terminal device having a provider side display device, and a plural number of user side terminal devices each having a user side input operation device and a user side display device, and capable of communicating through an information communication network with the provider side terminal, to function as:

an evaluated object information transmission means for transmitting evaluated object information, and a reaction information display means for receiving reaction information corresponding to the user side terminal devices, transmitted through the information communication network when the user side input operation device is operated in reaction to the evaluated object information transmitted from the evaluated object information transmission means and received with the user side terminal device through the information communication network and displayed on the user side display device, and for displaying information corresponding to the received reaction information on the provider side display device, wherein the system further has a communication information memory device having a communication information database for storing information contents, related to communication time and information type, transmitted between terminal devices constituting the system, the computer program further causes the provider side terminal device to function as a communication information reproduction means for acquiring, while specifying communication time and information type, the whole or part of the information communicated between the terminal devices and stored in the communication information database, and for reproducing and displaying information corresponding to the acquired information on the provider side display device, and the communication information reproduction means acquires graphic information sampled at certain intervals as the evaluated object information, acquires a reaction information transition graph showing a transition of sums in every sampling period of the number of nieces of the reaction information corresponding to the evaluated object information, and reproduces and displays the graphic information and the reaction information transition graph adjacent to each other on the provider side display device.

10. A recording medium recording thereon the computer program of claim 9.

11. A computer program embodied in a computer-readable medium for causing a user side terminal device used in a system comprising a provider side terminal device having a provider side display device, and a plural number of user side terminal devices, each having a user side input operation device and a user side display device, and capable of communicating through an information communication network with the provider side terminal, to function as:

an evaluated object information display means for receiving evaluated object information transmitted from the provider side terminal device through the information communication network and for displaying the received information on the user side display devices, and a reaction information transmission means for transmitting reaction information so that information corresponding to the reaction information corresponding to the user side terminal devices and transmitted to the provider side terminal device through the information communication network when the user side input operation devices are operated in reaction to the displayed evaluated object information, is displayed on the provider side display device, wherein the user side terminal devices are capable of communicating with other user side terminal devices through the information communication network, the computer program further causes each user side terminal device to function as:

an other user information acquisition means for receiving reaction information transmitted from other user side terminals through the information communication network and a reaction information display means for displaying information corresponding to reaction information from the respective user side terminal device, s on the user side display device, wherein the reaction information display means has a user icon display means that defines, in part of the user side display device, a user icons collective display area including a plural number of user icon display areas corresponding to the respective user side terminal devices and displaying, using icons, information corresponding to the reaction information from the respective user side terminal devices in corresponding user icon display areas, and the user icon display means changes colors of the icons displayed in the user icon display areas based on the reaction information.

12. A recording medium recording thereon the computer program of claim 11.

13. A computer program embodied in a computer-readable medium for causing a user side terminal device used in a system comprising a provider side terminal device having a provider side display device, and a plural number of user side terminal devices, each having a user side input operation device and a user side display device, and capable of communicating through an information communication network with the provider side terminal, to function as:

an evaluated object information display means for receiving evaluated object information transmitted from the provider side terminal device through the information communication network and for displaying the received information on the user side display devices, and a reaction information transmission means for transmitting reaction information so that information, corresponding to the reaction information corresponding to the user side terminal devices and transmitted to the provider side terminal device through the information communication network when the user side input operation devices are operated in reaction to the displayed evaluated object information, is displayed on the provider side display device, wherein the system further has a communication information memory device having a communication information database for storing information contents, related to communication time and information type, transmitted between terminal devices constituting the system, the user side terminal devices are capable of communicating with the communication information memory device, the computer program further causes the user side terminal devices to function as a communication information reproduction means for acquiring, while specifying communication time and type of information, the whole or part of the information communicated between the terminal devices and stored in the communication information database, and for reproducing and displaying information corresponding to the acquired information on the user side display device, and the communication information reproduction means acquires graphic information sampled at certain intervals as the evaluated object information, acquires a reaction information transition graph showing a transition of sums in every sampling period of the number of pieces of the reaction information corresponding to the evaluated object information, and reproduces and displays the graphic information and the reaction information transition graph adjacent to each other on the user side display device.

14. A recording medium recording thereon the computer program of claim 13.

* * * * *